United States Patent
Yamamoto et al.

(10) Patent No.: US 7,308,567 B2
(45) Date of Patent: Dec. 11, 2007

(54) INFORMATION PROCESSING APPARATUS FOR PERFORMING A SYSTEM BOOT BY USING PROGRAMS STORED IN A NON-VOLTILE STORAGE DEVICE

(75) Inventors: Yasunori Yamamoto, Takatsuki (JP); Keizo Sumida, Hirakata (JP); Yoshiteru Mino, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 447 days.

(21) Appl. No.: 11/019,054

(22) Filed: Dec. 22, 2004

(65) Prior Publication Data
US 2005/0144430 A1   Jun. 30, 2005

(30) Foreign Application Priority Data
Dec. 25, 2003   (JP)   ............................. 2003-431178

(51) Int. Cl.
*G06F 9/445* (2006.01)
*G06F 15/177* (2006.01)
*G06F 9/24* (2006.01)

(52) U.S. Cl. ............................ 713/1; 713/2; 713/100; 714/2; 714/36; 714/38; 717/168; 717/169; 717/173

(58) Field of Classification Search .................... 713/1; 714/2, 36, 38
See application file for complete search history.

(56) References Cited

U.S. PATENT DOCUMENTS 5,884,074 A   3/1999   Maeda et al.
7,073,064 B1 *   7/2006   Angelo et al. ............... 713/176
7,234,049 B2 *   6/2007   Choi et al. ..................... 713/1
7,234,052 B2 *   6/2007   Lee et al. ....................... 713/2
2002/0073307 A1   6/2002   Bautz et al.
2003/0172261 A1   9/2003   Lee et al.

FOREIGN PATENT DOCUMENTS

JP   2002-55822   2/2002

\* cited by examiner

*Primary Examiner*—Nitin C. Patel
(74) *Attorney, Agent, or Firm*—McDermott Will & Emery LLP

(57) ABSTRACT

After power activation, a transferer 14 detects a bootstrap program 111 having a first error check code 114 assigned thereto and being stored in a first storage device 11, subjects the bootstrap program 111 to an error detection/correction process, and transfers the bootstrap program 111 to the second storage device 12. If the transfer is properly completed, by executing the bootstrap program 111 on the second storage device 12, the CPU 10 performs an error detection/correction process for a main program 112 having a second error check code 115 assigned thereto, and transfers the main program 112 to a third storage device 13, after which the CPU's control branches out to the main program 112 on the third storage device 13. As a result, system boot can be performed without employing a NOR type flash memory.

23 Claims, 20 Drawing Sheets

Fig. 4

| BIT \ ADDRESS | 0 | 1 | 2 | 3 | 4 | 5 | 6 | 7 |
|---|---|---|---|---|---|---|---|---|
| 0 | 0 | 0 | 0 | 0 | P[ 0] | P[ 1] | P[ 2] | P[ 3] |
| 1 | 0 | 1 | 0 | 0 | P[ 4] | P[ 5] | P[ 6] | P[ 7] |
| 2 | 0 | 0 | 0 | 0 | P[ 8] | P[ 9] | P[10] | P[11] |
| 3 | 1 | 0 | 0 | 0 | P[12] | P[13] | P[14] | P[15] |
| ⋮ | | | | | | | | |

Columns 0–3: INFORMATION BIT (113)
Columns 4–7: ERROR CHECK CODE (116)

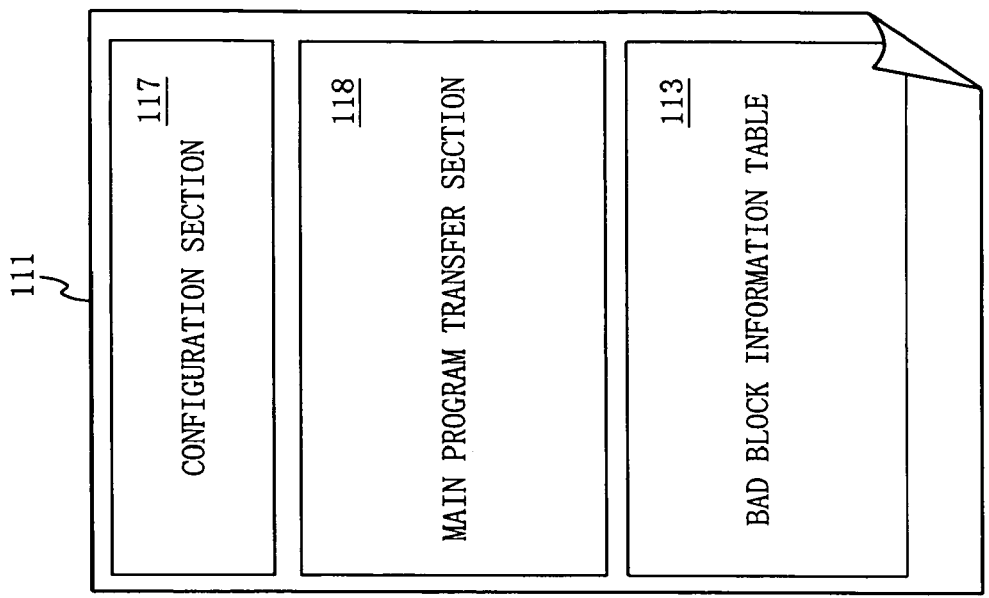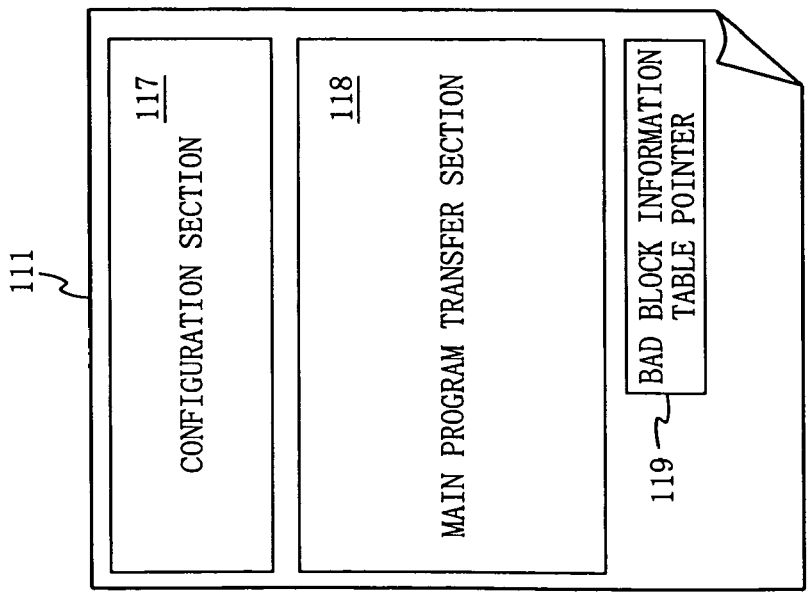

Fig. 12

| BIT\ADDRESS | 0 | 1 | 2 | 3 | 4 | 5 | 6 | 7 |
|---|---|---|---|---|---|---|---|---|
| 0 | D[0] | D[1] | D[2] | D[3] | P[0] | P[1] | P[2] | P[3] |
| 1 | D[4] | D[5] | D[6] | D[7] | P[4] | P[5] | P[6] | P[7] |
| 2 | D[8] | D[9] | D[10] | D[11] | P[8] | P[9] | P[10] | P[11] |
| 3 | D[12] | D[13] | D[14] | D[15] | P[12] | P[13] | P[14] | P[15] |
| ... | ... | ... | ... | ... | ... | ... | ... | ... |
| 508 | M[0] | M[1] | M[2] | M[3] | P[2032] | P[2033] | P[2034] | P[2035] |
| 509 | M[4] | M[5] | M[6] | M[7] | P[2036] | P[2037] | P[2038] | P[2039] |
| 510 | M[8] | M[9] | M[10] | M[11] | P[2040] | P[2041] | P[2042] | P[2043] |
| 511 | M[12] | M[13] | M[14] | M[15] | P[2044] | P[2045] | P[2046] | P[2047] |

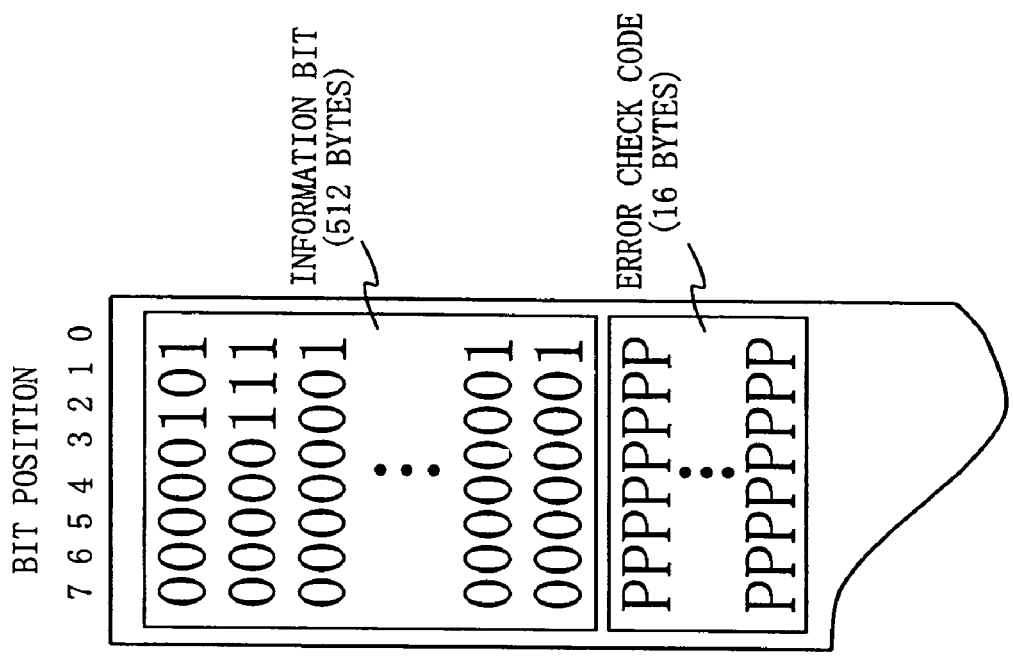
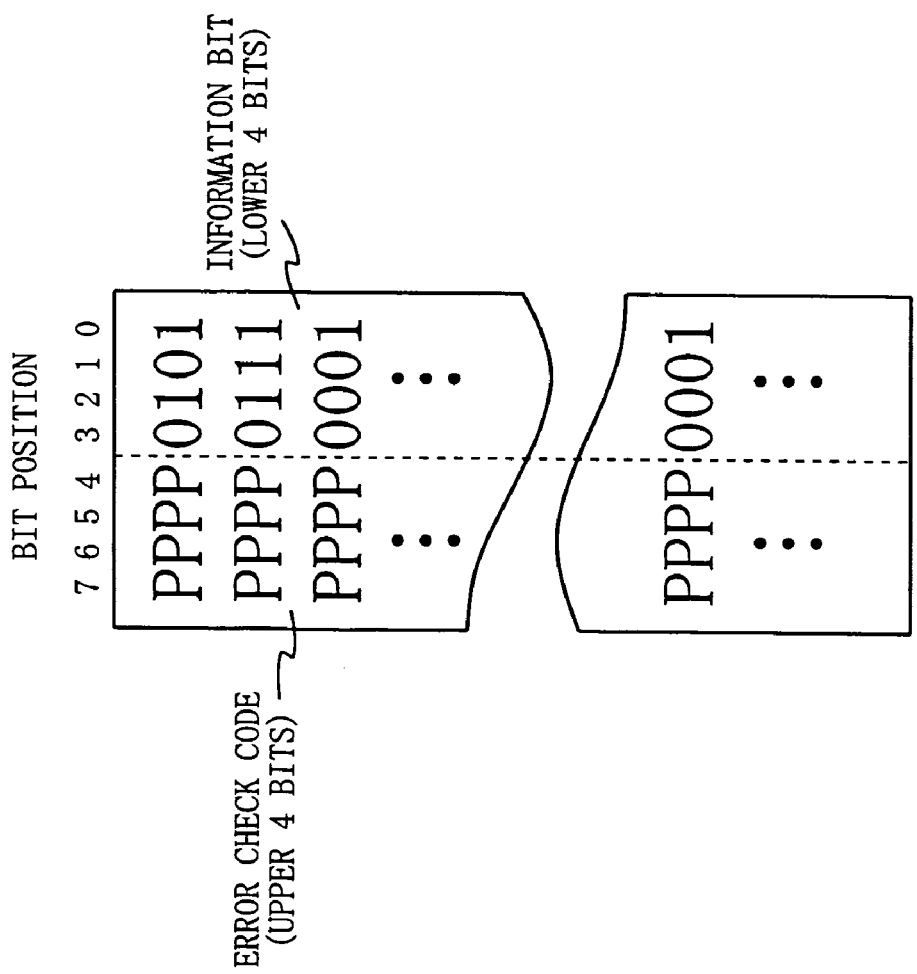

though a NAND type flash memory has an advantage in that it is inexpensive and permits a high degree of integration as compared to a NOR type flash memory.

INFORMATION PROCESSING APPARATUS FOR PERFORMING A SYSTEM BOOT BY USING PROGRAMS STORED IN A NON-VOLTILE STORAGE DEVICE

BACKGROUND OF THE INVENTION

1. Field of the Invention

The present invention relates to an information processing apparatus which performs a system boot by using a program stored in a storage device which may include a bad block(s), and requires an error detection/correction process after performing a read, e.g., a NAND type flash memory.

2. Description of the Background Art

Flash memories are generally classified into NOR types and NAND types. A NOR type flash memory has an advantage in that it is capable of accepting random access on a byte-by-byte basis, but has a disadvantage in that it is expensive and only permits a low degree of integration as compared to a NAND type flash memory. On the other hand, a NAND type flash memory is a memory which is presumed to include a certain population or less of bad blocks. Therefore, a read or write for a NAND type flash memory must be performed while keeping the positions of the bad blocks under management. Although a NAND type flash memory is disadvantageous in that it can only accept sequential access, and requires an error detection/correction process after a read is performed, a NAND type flash memory has an advantage in that it is inexpensive and permits a high degree of integration as compared to a NOR type flash memory.

The following technique has conventionally been practiced in order to execute a program which is stored in a storage device that includes bad blocks and requires an error detection/correction process after a read (hereinafter referred to as a "low-reliability memory"; e.g., a NAND type flash memory). The conventional technique not only employs a low-reliability memory, but also employs a storage device which does not include any bad blocks and does not require an error detection/correction process (hereinafter referred to as a "high-reliability memory"; e.g., a mask ROM or a NOR type flash memory). The low-reliability memory stores a main program to which error check code is assigned, whereas the high-reliability memory stores an initial program, which performs functions including transferring of the main program. A system CPU, after leaving a reset state, transfers the main program from the low-reliability memory to a RAM, in accordance with the initial program which is stored in the high-reliability memory. After the transfer of the main program is completed, the CPU's control branches out to the main program on the RAM, whereafter the main program on the RAM is executed.

Since there is no particular need to execute an initial program at a fast speed, an initial program might as well be stored in a slow storage device. Accordingly, there is also known a technique which does not employ a high-reliability memory to store an initial program, but performs a system boot by using an initial program stored in a NAND type flash memory. Such a technique is described in, for example, Japanese Laid-Open Patent Publication No. 2002-55822. According to the technique described in this publication, the initial program stored in the NAND type flash memory is transferred by a transfer circuit to a static RAM or the like at the time of power activation.

However, in the technique described in this publication, no error detection/correction process is performed when an initial program (including a bootstrap program, drivers, and the like) is transferred to a static RAM or the like. Therefore, if the initial program which has been read contains an error, system boot cannot be performed properly. Since a static RAM is more expensive than other types of storage devices, an increase in the size of the initial program leads to an increased cost of the entire system.

SUMMARY OF THE INVENTION

Therefore, an object of the present invention is to provide an information processing apparatus which can stably perform a system boot without requiring a high-reliability memory to store an initial program.

The present invention has the following features to attain the object mentioned above.

A first aspect of the present invention is directed to an information processing apparatus for performing a system boot by using programs stored in a non-volatile storage device, comprising: a CPU; anon-volatile first storage device for storing, as programs to be executed by the CPU, a bootstrap program having a first check code assigned thereto, and a main program having a second check code assigned thereto, the second check code being calculated by a method different from that used for calculating the first check code; a transferer for reading a program stored in the first storage device, wherein, during a system boot, the transferer reads the bootstrap program from the first storage device, subjects the bootstrap program to a first error detection/correction process based on the first check code, and transfers the processed bootstrap program to the second storage device; a volatile second storage device for storing the program read from the first storage device; and a CPU controller for prohibiting an operation of the CPU until the transfer of the bootstrap program is completed. Based on this structure, system boot can be stably performed by using programs having check codes assigned there to and being stored in a low-reliability memory (such as a NAND type flash memory), without employing a high-reliability memory (such as a ROM) for storing an initial program.

In this case, when no longer prohibited by the CPU controller, in accordance with the bootstrap program stored in the second storage device, the CPU may transfer the main program stored in the first storage device to the second storage device and subject the main program to a second error detection/correction process based on the second check code. Based on this structure, it is possible to perform an intricate software-based error detection/correction process for the main program, in accordance with the bootstrap program after the error detection/correction process.

The transferer may include: a transfer control section for controlling the transfer of the bootstrap program; an error processing section for performing the first error detection/correction process based on the first check code for the bootstrap program being transferred; and a notification section for, if the error processing section has not detected any uncorrectable errors when the transfer of the bootstrap program is completed, notifying completion of the transfer to the CPU controller. Based on this structure, system boot can be stably performed by using programs having check codes assigned thereto and being stored in a low-reliability memory, without employing a high-reliability memory for storing an initial program.

The CPU controller may prohibit supply of a clock signal for the CPU until the transfer of the bootstrap program is completed. Alternatively, the CPU controller may continuously supply a reset signal for the CPU until the transfer of the bootstrap program is completed. Based on this structure, the operation of the CPU can be prohibited by only using a small amount of hardware.

The CPU controller may prevent the CPU from accessing the second storage device until the transfer of the bootstrap program is completed. More preferably, the CPU controller arbitrates an access right to a bus connected to the second storage device in such a manner that priority is given to the transferer until the transfer of the bootstrap program is completed and that priority is given to the CPU after the transfer of the bootstrap program is completed. Based on this structure, the operation of the CPU can be prohibited by only introducing a slight change in the access controlling circuitry for the second storage device.

The CPU controller may keep prohibiting the CPU from operating if the transfer of the bootstrap program fails. Based on this structure, system runway can be prevented from occurring when a system boot has failed.

The first storage device may include a plurality of blocks each of which is identified as either a normal block or a bad block, and the bootstrap program, the main program, and stored position information representing a stored position of the main program in the first storage device may be stored in a normal block of the first storage device. Based on this structure, there is provided an information processing apparatus capable of performing system boot by using a program stored in a low-reliability memory which includes normal blocks and bad blocks, e.g., a NAND type flash memory.

In particular, the bootstrap program may include the stored position information and an error processing program for performing the second error detection/correction process based on the second check code, and when no longer prohibited by the CPU controller, the CPU may transfer the main program stored in the first storage device to the second storage device via the transferer in accordance with the stored position information after the first error detection/correction process based on the first check code, and perform a second error detection/correction process based on the second check code for the main program stored in the second storage device in accordance with the error processing program after the first error detection/correction process based on the first check code. Based on this structure, it is possible to read the main program from the correct stored position, and perform an intricate software-based error detection/correction process for the main program having been read.

Alternatively, the first storage device stores the stored position information having the first check code assigned thereto; the transferer performs a first error detection/correction process based on the first check code also for the stored position information read from the first storage device; the bootstrap program includes an address at which the stored position information is stored in the first storage device and an error processing program for performing the second error detection/correction process based on the second check code, and when no longer prohibited by the CPU controller, the CPU transfers the stored position information stored in the first storage device to the second storage device via the transferer by using the address after the first error detection/correction process based on the first check code, transfers the main program stored in the first storage device to the second storage device via the transferer in accordance with the stored position information after the first error detection/correction process based on the first check code, and performs the second error detection/correction process based on the second check code for the main program stored in the second storage device in accordance with the error processing program after the first error detection/correction process based on the first check code. Based on this structure, the bootstrap program can be reduced in size, and it is possible to read the main program from the correct stored position, and perform an intricate software-based error detection/correction process for the main program having been read.

The bootstrap program may be stored, in data units of a predetermined size, in the normal block of the first storage device, and the transferer may read each data unit of the predetermined size of the bootstrap program from the first storage device, subject the data unit to a first error detection/correction process based on the first check code, and transfer the processed data unit to the second storage device. Based on this structure, for each data unit divided in a predetermined size, a check code which provides a desirable error detection/correction ability can be assigned as the first check code.

In particular, if an uncorrectable error is detected as a result of performing the error detection/correction process based on the first check code for the data unit of the predetermined size read from the first storage device, the transferer may read a next data unit to be processed from a normal block next to the block containing the data unit. Based on this structure, the bootstrap program stored in the first storage device, which includes bad blocks, can be properly detected.

Alternatively, the bootstrap program may be stored in the normal block of the first storage device in data units of the predetermined size and with a collation code assigned to each data unit, and the transferer may retain reference data for the collation code, and if a collation code which is identical to the reference data is assigned to the data unit of the predetermined size read from the first storage device, transfer the read data unit to the second storage device. Based on this structure, the problem of mistaking a bad block for a normal block can be solved, and the bootstrap program stored in the first storage device, which includes bad blocks, can be quickly detected.

More preferably, the transferer is arranged so as to allow the reference data to be changed based on given data. Based on this structure, even in the presence of different CPU revisions or system configurations, etc., a system boot can be properly performed by selecting a bootstrap program from within the first storage device in accordance with the CPU revision, system configuration, etc.

The transferer may include: a transfer control section for controlling the transfer of the bootstrap program; a first error processing section for performing the first error detection/correction process based on the first check code for the bootstrap program being transferred; a second error processing section for performing at least a portion of the second error detection/correction process based on the second check code for the main program read from the first storage device; and a notification section for, if the first error processing section has not detected any uncorrectable errors when the transfer of the bootstrap program is completed, notifying completion of the transfer to the CPU controller. Based on this structure, the error detection/correction process for the main program can be performed rapidly, and system boot can be performed rapidly.

In particular, the second error processing section may calculate a syndrome based on the second check code with respect to the main program read from the first storage device, and in accordance with the bootstrap program stored in the second storage device, the CPU may perform rest of the second error detection/correction process based on the second check code for the main program read from the first storage device, by using the syndrome calculated by the second error processing section. Based on this structure, by only using a small amount of hardware, the error detection/correction process for the main program can be enhanced in speed.

Alternatively, when the notification section has notified completion of the transfer, the transferer may switch the processing section to process the program read from the first storage device from the first error processing section to the second error processing section. Based on this structure, when the transfer of the bootstrap program is completed, the content of the error detection/correction process in the transferer can be switched automatically.

Alternatively, the transferer may switch the processing section to process the program read from the first storage device from the first error processing section to the second error processing section under control of the CPU. Based on this structure, the content of the error detection/correction process in the transferer can be switched automatically through software processing by the CPU.

Alternatively, if the second error processing section has detected an uncorrectable error, the transferer may notify the CPU of a failure of the transfer, and the CPU may perform an abnormality handling process when receiving a notification of a failure of the transfer. Based on this structure, if a system boot fails, the system can be brought to an abnormal end, and the occurrence of an irrecoverable error can be notified to the user.

In addition to transferring the bootstrap program, under control of the CPU, the transferer may read the main program from the first storage device in data units of a predetermined size, and transfer each data unit read to the second storage device. Based on this structure, the bootstrap program can be reduced in size, the load on the CPU can be reduced, and system boot can be performed rapidly.

A second aspect of the present invention is directed to an information processing apparatus for performing a system boot by using programs stored in a non-volatile storage device, comprising: a CPU; anon-volatile first storage device for storing, as programs to be executed by the CPU, a bootstrap program having a first check code assigned thereto, and a main program having a second check code assigned thereto, the second check code being calculated by a method different from that used for calculating the first check code; a transferer for reading a program stored in the first storage device; and a volatile second storage device for storing the program read from the first storage device, wherein, the transferer reads the bootstrap program from the first storage device, subjects the bootstrap program to a first error detection/correction process based on the first check code and internally stores the processed bootstrap program, and outputs the stored bootstrap program in response to a read request from the CPU, and during a system boot, the CPU operates in accordance with the bootstrap program stored in the transferee. Based on this structure, system boot can be stably performed by using programs having check codes assigned thereto and being stored in a low-reliability memory (such as a NAND type flash memory), without employing a high-reliability memory (such as a ROM) for storing an initial program. Furthermore, it is unnecessary to secure a memory area for storing the bootstrap program.

In this case, the bootstrap program may include an error processing program for performing the error detection/correction process based on the second check code, and during the system boot, in accordance with the bootstrap program stored in the transferer, the CPU may perform the error detection/correction process based on the second check code for the main program read from the first storage device. Based on this structure, it is possible to perform an intricate software-based second error detection/correction process for the main program, in accordance with the bootstrap program after the first error detection/correction process.

A third aspect of the present invention is directed to a ROM image generation apparatus for generating, based on a plurality of data, a ROM image to be written to a storage device including a bad block, comprising: a bad block information retaining section for retaining position information of the bad block included in the storage device to which the ROM image is to be written; a code information management section for managing types of check code in association with types of input data; an image reformatting section for converting input data to a format suitable for having assigned thereto a check code associated with the type of input data; and a write image generation section for, by referring to the position information stored in the bad block information retaining section, merging a plurality of data having been reformatted by the image reformatting section into a single data while avoiding the bad block, and assigning the check code associated with the type of input data to the merged data. Based on this structure, it is possible to generate a ROM image to be written to a memory to be used as the first storage device included in an information processing apparatus according to the first or second aspect of the present invention. A check code which is in accordance with the type of data is assigned, and a ROM image can be generated so that none of its data will be stored in a bad block.

In this case, the ROM image generation apparatus may further comprise a collation code retaining section for retaining a collation code, and the image reformatting section may assign to the input data the collation code retained in the collation code retaining section. Based on this structure, a ROM image having a collation code assigned thereto can be generated.

The ROM image generation apparatus may further comprise a memory control section for performing a process of searching for a position of the bad block in the storage device to obtain the position information and a process of writing the data generated by the write image generation section to the storage device. Based on this structure, a ROM image generation apparatus capable of writing a ROM image to an actual memory can be obtained.

Thus, in accordance with the information processing apparatus of the present invention, system boot can be stably performed by using programs having check codes assigned thereto and being stored in a low-reliability memory (such as a NAND type flash memory), without employing a high-reliability memory (such as a ROM) for storing an initial program. Moreover, in accordance with the ROM image generation apparatus of the present invention, it is possible to generate a ROM image to be written to a memory to be used as the first storage device included in the information processing apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating the format of a bad block information table and a third error check code in the information processing apparatus shown in FIG. 1;

FIGS. 8A and 8B are diagrams illustrating exemplary structures of a bootstrap program in the information processing apparatus shown in FIG. 1;

FIG. 12 is a diagram illustrating the format of a bootstrap program and a first error check code in the information processing apparatus shown in FIG. 11;

FIGS. 21A and 21B are diagrams illustrating outputs from a reformatting section in the ROM image generation apparatus shown in FIG. 20.

DESCRIPTION OF THE PREFERRED EMBODIMENTS

Hereinafter, with reference to the figures, various embodiments of the present invention will be described. In each embodiment, any component elements that are identical to those in a preceding embodiment will be denoted by like numerals, and the descriptions thereof will be omitted.

First Embodiment

Figure 1:
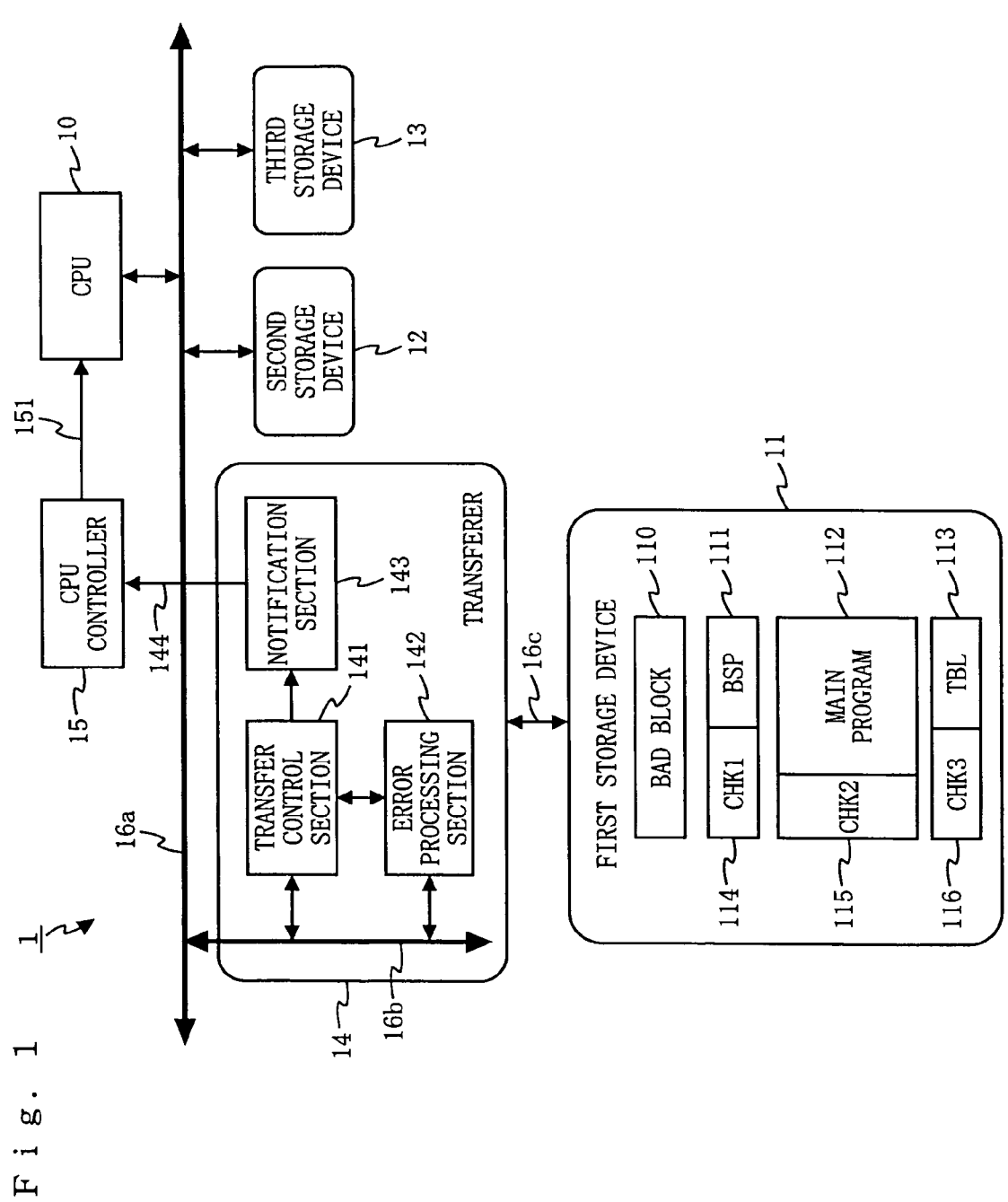
FIG. 1 is a diagram illustrating the structure of an information processing apparatus according to a first embodiment of the present invention.

FIG. 1 is a diagram illustrating the structure of an information processing apparatus according to a first embodiment of the present invention. The information processing apparatus 1 shown in FIG. 1 comprises a CPU 10, first to third storage devices 11 to 13, a transferer 14, and a CPU controller 15.

The CPU 10 is the main CPU of the information processing apparatus 1. In an initial state which exists before power activation, any program to be executed by the CPU 10 is stored in the first storage device 11. The contents of the second and third storage devices 12 and 13 in the initial state are not defined. The first to third storage devices 11 to 13 are interconnected via data buses 16a to 16c. Once power is activated, the programs stored in the first storage device 11 are transferred to the second and third storage devices 12 and 13. More specifically, in the initial state, the first storage device 11 stores a bootstrap program (Bootstrap Program: hereinafter abbreviated as "BSP") 111, which governs an initial setting operation, as well as a main program 112. The BSP 111 is to be transferred to the second storage device 12, and the main program 112 is to be transferred to the third storage device 13. Until completion of the transfer of the BSP 111, the CPU controller 15 prohibits instruction fetches by the CPU 10.

Figure 2:
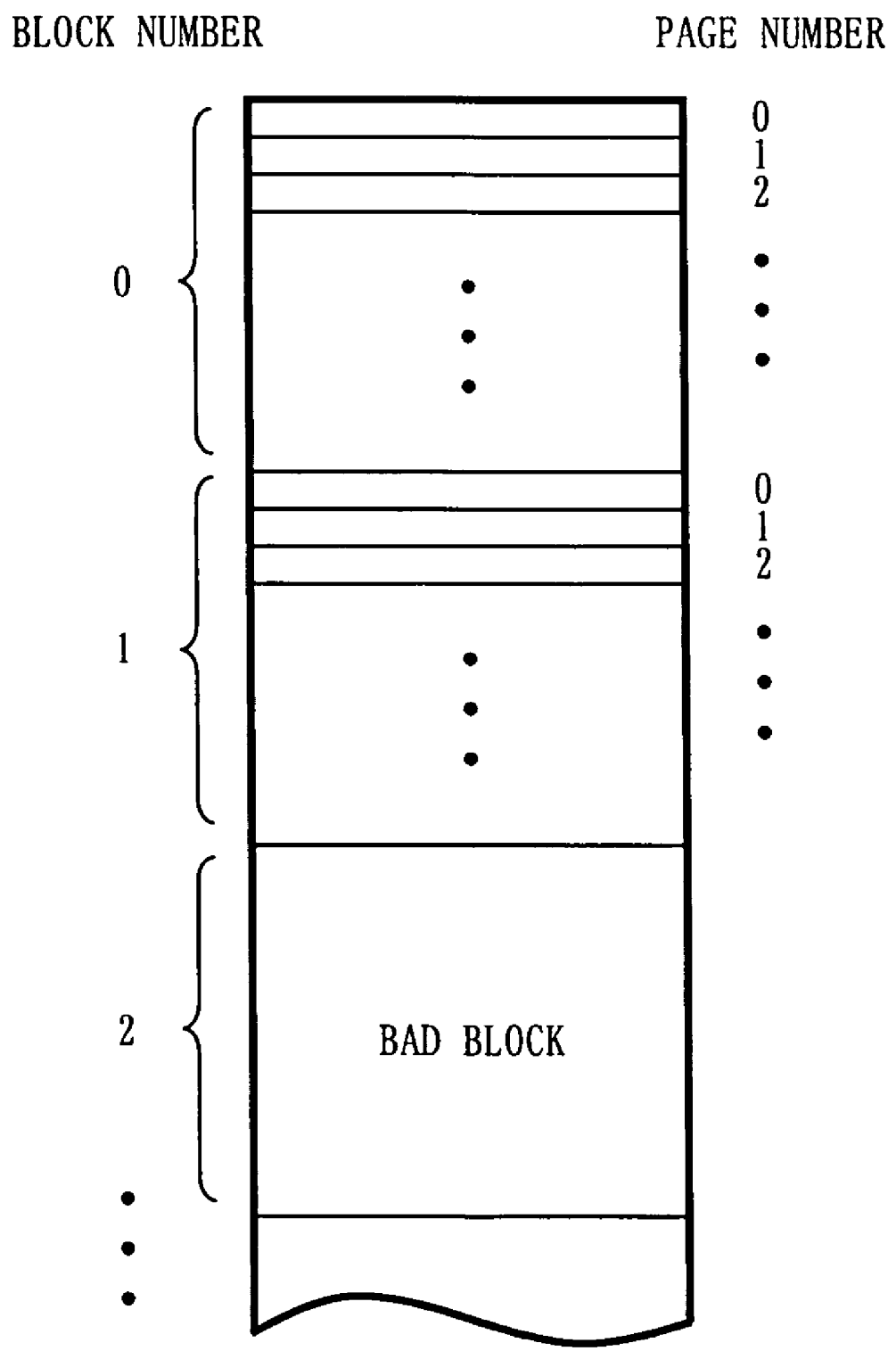
FIG. 2 is a diagram illustrating a relationship between blocks and pages in a NAND type flash memory.

The first storage device 11 is composed of a non-volatile storage device which may include a bad block(s), i.e., blocks which do not properly perform a memory function, and requires an error detection/correction process at the time of a read. Hereinafter, it is assumed that the first storage device 11 is a NAND type flash memory. FIG. 2 is a diagram illustrating a relationship between blocks and pages in a NAND type flash memory. As shown in FIG. 2, storage areas of the NAND type flash memory are divided into a plurality of blocks, each block being further divided into a plurality of pages. In one type of NAND type flash memory, one block consists of 32 pages, where each page consists of 512 bytes of data and 16 bytes of spare area, totaling 528 bytes, for example. Depending on the type of NAND type flash memory, however, the block size and the page size may take any values other than 32 pages and 528 bytes. Since the first storage device 11 is assumed to include a bad block(s), any read or write for the first storage device 11 must be performed so as to avoid the bad block(s).

As shown in FIG. 1, in blocks other than the bad block(s) 110, the first storage device 11 stores the BSP 111, the main program 112, a bad block information table 113, and first to third error check codes 114 to 116. The BSP 111 at least contains a system configuration necessary for performing a system boot and a main program transfer routine for transferring the main program 112 from the first storage device 11 to the third storage device 13 (see FIGS. 8A and 8B, described later). The main program 112 is a program to be executed by the CPU 10 after completion of a system boot. In any information processing apparatus, generally speaking, the size of the main program 112 is greater than the size of the BSP 111. The bad block information table 113 is a table representing the position(s) of the bad block(s) (see FIG. 4, described later). The first to third error check codes 114 to 116 are error check codes which are assigned to the BSP 111, the main program 112, and the bad block information table 113, respectively. As described below, the first and the third error check codes 114 and 116 are calculated by the same method, whereas the second error check code 115 is calculated by a method different therefrom.

Figure 3:
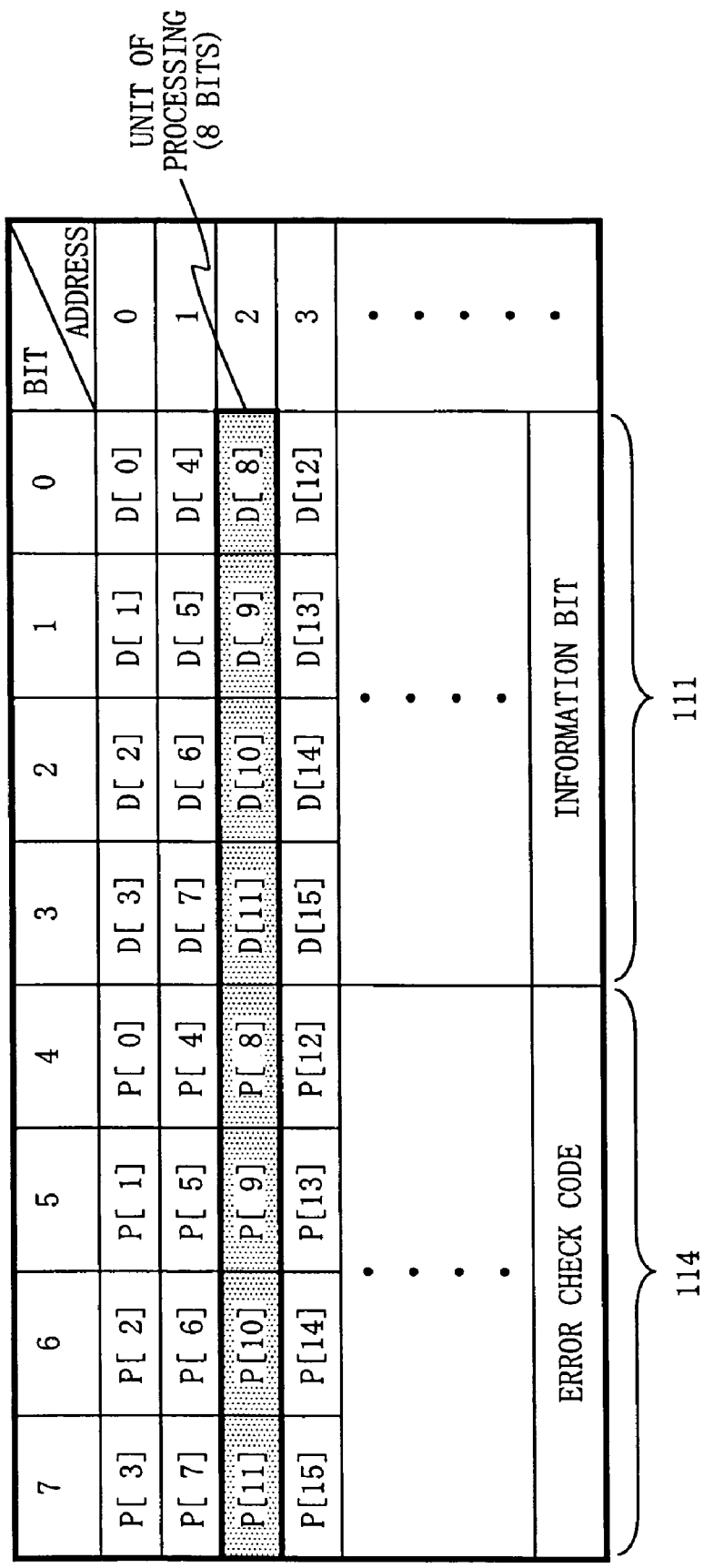
FIG. 3 is a diagram illustrating the format of a bootstrap program and a first error check code in the information processing apparatus shown in FIG. 1.

FIG. 3 is a diagram illustrating the format of the BSP 111 and the first error check code 114. In FIG. 3, D[i] represents an information bit, whereas P[i] represents an error check code bit (where i is a non-negative integer; the same assumption holds true for any instance of "i" hereafter). As shown in FIG. 3, the BSP 111 is stored in the lower 4 bits of each address, and the first error check code 114 is stored in the upper 4 bits of each address. More specifically, the BSP 111 is divided into groups of 4 bits from its beginning, and each of these groups is stored in the lower 4 bits of each address, in an ascending order of addresses. For each group of 4 bits thus divided, a 4-bit first error check code 114 is to be calculated (by a calculation method described below), and stored in the upper 4 bits of each address in an ascending order of addresses. Thus, the BSP 111 and the first error check code 114 are processed in units of 4 bits, totaling 8 bits.

FIG. 4 is a diagram illustrating the format of the bad block information table 113 and the third error check code 116. In FIG. 4, the lower 4 bits of each address (value "0" or "1") represents an information bit, whereas P[i] represents an error check code bit. The bad block information table 113 is stored in the lower 4 bits of each address, and the third error check code 116 is stored in the upper 4 bits of each address. More specifically, the bad block information table 113 stores information indicating whether each block in the first storage device 11 is good (normal) or bad, spending one bit per block. The bad block information table 113 is divided into groups of 4 bits from its beginning, and each of these groups is stored in the lower 4 bits of each address, in an ascending order of addresses. For each group of 4 bits thus divided, a 4-bit third error check code 116 is to be calculated by using the same calculation method as that used for the calculation of the BSP 111, and stored in the upper 4 bits of each address in an ascending order of addresses.

For example, if a NAND type flash memory having a capacity of 256 Mbits and a block size of 16 Kbytes is used as the first storage device 11, the total number of blocks is 2048. In this case, in one of the normal blocks of the first storage device 11, an area which is twice as much as 2 Kbits, i.e., 512 bytes, is secured (which includes an area for storing the third error check code 116). In the secured storage area of 512 bytes, the bad block information table 113 and the third error check code 116 are stored. Assuming that a value "0" for each normal block and a value "1" for each bad block are to be stored in the bad block information table 113, the bad block information table 113 shown in FIG. 4 would indicate that the fifth and the twelfth blocks in the first storage device 11 are bad blocks.

For any NAND type flash memory, depending on its type, use of a particular encoding method is recommend. In the case of the aforementioned NAND type flash memory containing 512-byte pages of data and 16-byte spare area, for example, it is recommended to conduct an encoding which allows a 1-bit error correction and a 2-bit error detection to be performed at least for 512 bytes of data. Accordingly, the main program 112 is divided into groups of 512 bytes from its beginning, and for each group of 512 bytes thus divided, a second error check code 115 (about 24 bits) as calculated by the encoding method that is recommend for the NAND type flash memory is assigned.

Knowledge as to whether a block in the first storage device 11 is good (normal) or bad can be obtained by, prior to performing a write to the first storage device 11, accessing the first storage device 11 by a predetermined method. When performing a write to the first storage device 11, it is necessary to ensure that the write is not performed for the bad blocks but is only performed for the normal blocks. In the following description, it is assumed that the BSP 111 is to be stored in one or more consecutive blocks whose block numbers are the smallest among the normal blocks included in the first storage device 11, flush from the first page. It is also assumed that the main program 112 is to be stored in one or more consecutive blocks following the blocks in which the BSP 111 is stored, flush from the first page, among the normal blocks included in the first storage device 11.

The second storage device 12 is a volatile memory which can be accessed by both the CPU 10 and the transferer 14 without requiring any special initial setting. Since the BSP 111 is to be transferred to the second storage device 12 as described above, a memory having a capacity greater than the size of the BSP 111 is used as the second storage device 12. Since the second storage device 12 will become unnecessary once the CPU 10 finishes execution of the BSP 111 on the second storage device 12, the information processing apparatus 1 may utilize a static RAM or the like which already lies internal to the system LSI as the second storage device 12, rather than being equipped with a dedicated memory which serves as the second storage device 12. Although the second and third storage devices 12 and 13 will conveniently be regarded as separate storage devices in the following description, it will be appreciated that the second and third storage devices 12 and 13 may instead be discrete storage areas which are secured within a single storage device. In this case, after a system boot is completed, the storage area which is secured as the second storage device 12 may be utilized as a work area, for example.

Since the main program 112 is to be transferred to the third storage device 13 as described above, a memory having a greater capacity than that of the second storage device 12 is used as the third storage device 13. Therefore, the third storage device 13 is desirably a volatile storage device which permits random access and whose price per bit is low, e.g., an SDRAM.

As shown in FIG. 1, the transferer 14 includes a transfer control section 141, an error processing section 142, and a notification section 143. The transfer control section 141 has a function of automatically transferring the BSP 111 stored in the first storage device 11 to the second storage device 12, and a function of reading the main program 112 stored in the first storage device 11 under the control of the CPU 10. When the BSP 111 is transferred from the first storage device 11 to the second storage device 12, the error processing section 142 performs an error detection/correction process for the BSP 111 being transferred, based on the first error check code 114. If the transfer of the BSP 111 is properly completed, the notification section 143 outputs a transfer completion notifying signal 144 indicating proper completion of the transfer to the CPU controller 15.

Figure 5:
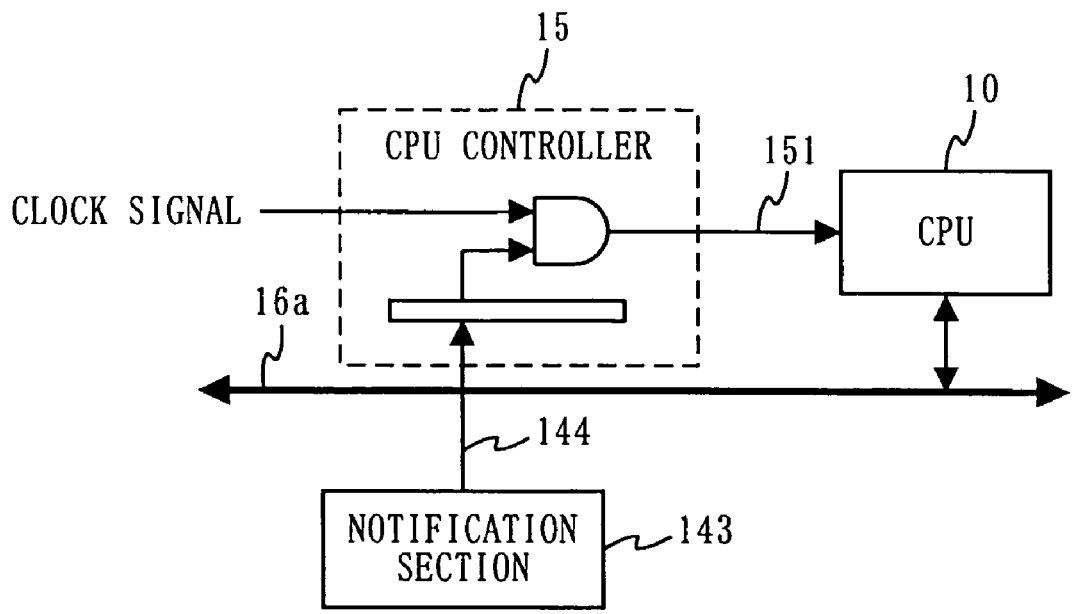
FIG. 5 is a diagram illustrating an exemplary structure of a CPU controller in the information processing apparatus shown in FIG. 1.
Figure 6:
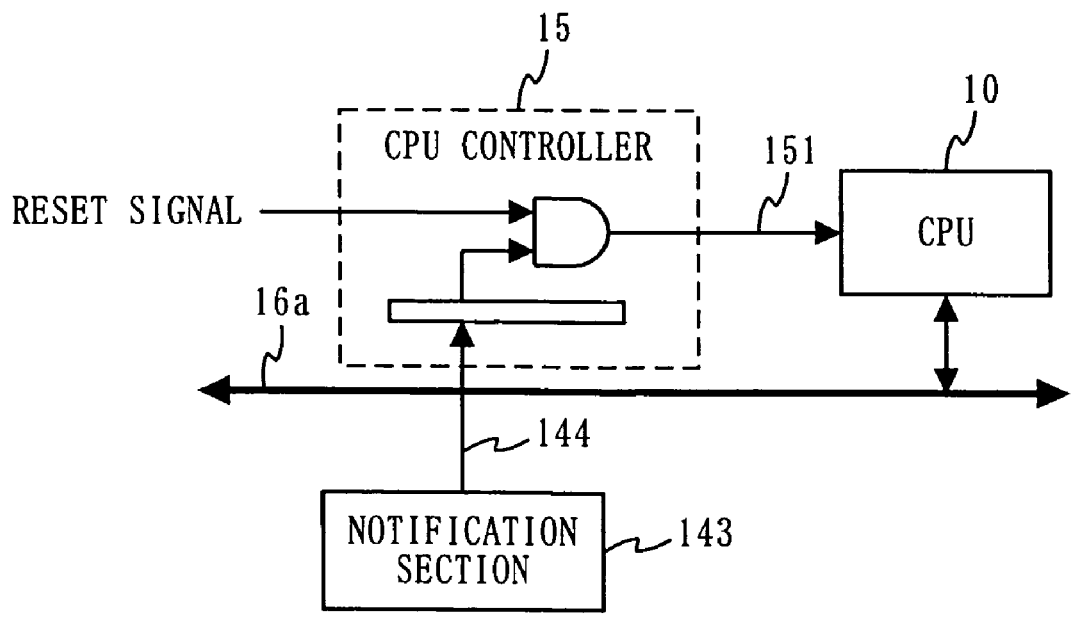
FIG. 6 is a diagram illustrating an exemplary structure of a CPU controller in the information processing apparatus shown in FIG. 1.

Based on the transfer completion notifying signal 144 output from the notification section 143, the CPU controller 15 outputs a CPU activation control signal 151. FIGS. 5 and 6 are diagrams illustrating exemplary structures of the CPU controller 15. In a structure shown in FIG. 5, the CPU controller 15 masks a clock signal for the CPU 10 until the transfer completion notifying signal 144 become active, thus suspending the CPU 10. Once the transfer completion notifying signal 144 becomes active, the CPU controller 15 no longer masks the clock signal, and the CPU 10 begins to operate. In a structure shown in FIG. 6, the CPU controller 15 allows a reset signal for the CPU 10 to pass through until the transfer completion notifying signal 144 becomes active, thus suspending the CPU 10. Once the transfer completion notifying signal 144 becomes active, the CPU controller 15 masks the reset signal, so that the CPU 10 begins operating. Based on such actions of the CPU controller 15, instruction fetches by the CPU 10 are prohibited until the transfer completion notifying signal 144 becomes active.

Hereinafter, the details of the transferer 14 will be described. Once power is activated, the transferer 14 obtains a position in the first storage device 11 at which the BSP 111 is stored, sequentially reads the BSP 111 from this stored position page by page, and transfers the BSP 111 to the second storage device 12. More specifically, once power is activated, the transfer control section 141 sequentially reads the stored content from the beginning of the first storage device 11. The error processing section 142 performs an error detection/correction process for each unit of processing of 8 bits as shown in FIG. 3. The transfer control section 141 packs each 4-bit piece of the BSP 111 resulting after the error detection/correction process into predetermined transfer units, which are then transferred to the second storage device 12. Herein, a transfer destination for the data in the second storage device 12 is sequentially updated, beginning from an address from which the CPU 10 fetches an instruction for the first time after power activation. In the present embodiment, it is assumed that the transferer 14 performs transfer by a transfer unit of 16 bits, and that the address from which the CPU 10 first fetches an instruction is the first address of the second storage device 12.

Now, an error detection/correction process to be performed in the error processing section 142 will be described. The first error check code 114 to be assigned to the BSP 111 may be any code that satisfies the recommend specifications of the first storage device 11. In the case of the aforementioned NAND type flash memory containing 512-byte pages of data and 16-byte spare area, for example, it is recommended to perform an encoding which allows a 1-bit error correction and a 2-bit error detection to be performed for 512 bytes of data. In this case, minimum requirements can be satisfied by selecting as the first error check code 114 a code which permits a 1-bit error correction and a 2-bit error detection to be performed for information bits of 512 bytes or less.

In the present embodiment, a code which provides a higher error detection/correction processing ability than that provided by a 1-bit error correction and a 2-bit error detection is used for the first error check code 114 so that system boot can be properly performed even if more defects than is contemplated in a 1-bit error correction and a 2-bit error detection are contained in the first storage device 11. Specifically, the first error check code 114 is calculated by using a generator matrix G based on the BSP 111, as expressed by eq. 1 below. In the following description, it is assumed that D[0] to D[3] represent a 4-bit piece of the BSP 111; P[0] to P[3] represent the first error check code assigned to D[0] to D[3], and that exclusive OR is used for each addition in the matrix calculations.

$$[P[0]\ P[1]\ P[2]\ P[3]] = [D[0]\ D[1]\ D[2]\ D[3]]G \quad \text{eq. 1}$$

$$\text{where } G = \begin{bmatrix} 1 & 0 & 1 & 0 \\ 0 & 1 & 1 & 0 \\ 1 & 0 & 0 & 1 \\ 0 & 1 & 0 & 1 \end{bmatrix}$$

A syndrome [X[0] X[1] X[2] X[3]] of a code [D[0] D[1] D[2] D[3] P[0] P[1] P[2] P[3]] obtained by eq. 1 is calculated by using a check matrix H, as expressed by eq. 2:

$$[X[0]\ X[1]\ X[2]\ X[3]] = [D[0]\ D[1]\ D[2]\ D[3]\ P[0]\ P[1]\ P[2]\ P[3]]H^T \quad \text{eq. 2}$$

$$\text{where } H = \begin{bmatrix} 1 & 0 & 1 & 0 & 1 & 0 & 1 & 0 \\ 0 & 1 & 0 & 1 & 0 & 1 & 0 & 0 \\ 1 & 1 & 0 & 0 & 0 & 0 & 1 & 0 \\ 0 & 0 & 1 & 1 & 0 & 0 & 0 & 1 \end{bmatrix};$$

$H^T$ represents a transpose matrix of $H$

Next, the error processing section 142 performs the following processes, depending on the values of X[3] to X[0] thus obtained (where X={αβγδ} means that X[3]=α; X[2]=β; X[1]=γ; and X[0]=δ):

a) if X={0000}, then no error; error correction is not performed;
b) if X={0101}, then D[0] is an error; D[0] is inverted;
c) if X={0110}, then D[1] is an error; D[1] is inverted;
d) if X={1001}, then D[2] is an error; D[2] is inverted;
e) if X={1010}, then D[3] is an error; D[3] is inverted;
f) if X={0001}, then P[0] is an error; error correction is not performed;
g) if X={0010}, then P[1] is an error; error correction is not performed;
i) if X={0100}, then P[2] is an error; error correction is not performed; and
j) if X={1000}, then P[3] is an error; error correction is not performed.

Cases (b) to (e) are the cases where a 1-bit error occurring in an information bit is corrected. Cases (f) to (j) are the cases where the information bit is not corrected since a 1-bit error exists only in the error check code. If X takes any value other than the aforementioned, the error processing section 142 determines that an uncorrectable error has occurred. It will be appreciated that the above-described calculation method for the first error check code 114 is only exemplary, and that any other calculation method may be used.

Figure 7:
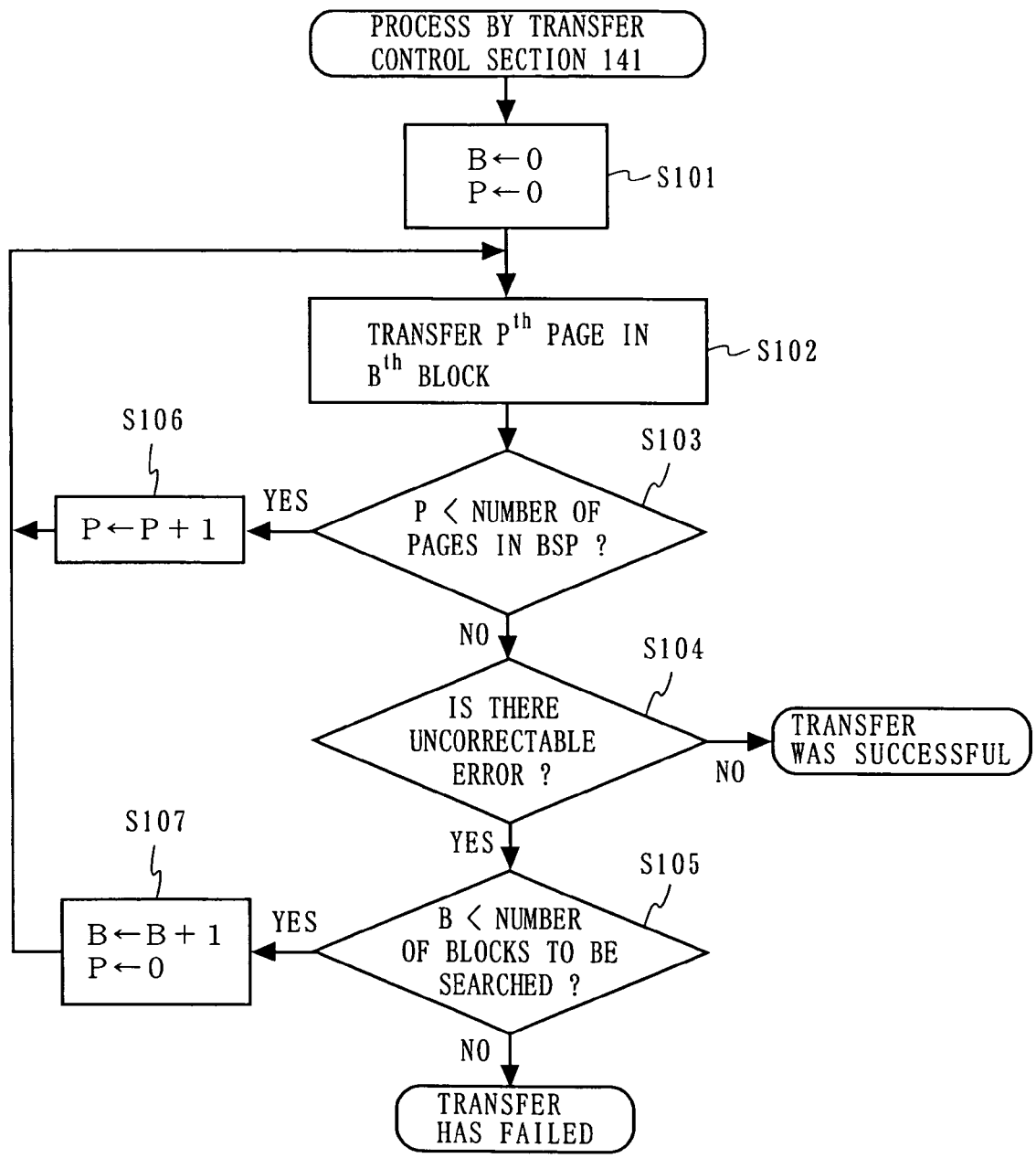
FIG. 7 is a flowchart illustrating an operation of a transferer in the information processing apparatus shown in FIG. 1.

FIG. 7 is a flowchart illustrating an operation of the transfer control section 141 after power activation. In accordance with the procedure shown in FIG. 7, the transfer control section 141 obtains a position in the first storage device 11 at which the BSP 111 is stored, sequentially reads the BSP 111 from this stored position page by page, and transfers the BSP 111 to the second storage device 12. It is assumed herein that the size of the BSP 111 is one block or less. Variable B represents a block number which is read, and variable P represents a page number which is read.

Once power is activated, the transfer control section 141 first initializes B and P to 0 (step S101). As a result, a read position in the first storage device 11 is set at the first page (i.e., "page 0") in the first block (i.e., "block 0"). Next, the transfer control section 141 reads the $p^{th}$ page in the $B^{th}$ block in the first storage device 11, and transfers this page to a predetermined address in the second storage device 12 (step S102). At this time, the error processing section 142 divides the transferred page into predetermined units of processing (assumed to be 8 bits each in this example), and performs an error detection/correction process for each unit of processing. If any correctable error is contained in each unit of processing, the error processing section 142 corrects the error. If any uncorrectable error (i.e., an error which lies beyond the correction ability) is contained in each unit of processing, the error processing section 142 internally stores this fact.

Next, the transfer control section 141 determines whether P is smaller than the number of pages in the BSP 111 (hereinafter referred to as "M") (step S103). If the result of the determination is YES, the transfer control section 141 adds 1 to P (step S106), and proceeds to step S102. Thus, the transfer at step S102 is executed M times in succession. If the result of the determination of step S103 is NO, the transfer control section 141 determines whether an uncorrectable error has been detected during the transfer of M pages at step S102 (step S104). If the result of the determination is NO, the transfer control section 141 determines that the transfer of the BSP 111 was successful, and ends the process. In this case, the notification section 143 outputs the transfer completion notifying signal 144 to the CPU controller 15.

If the result of the determination of step S104 is YES, the transfer control section 141 determines whether B is smaller than the number of blocks to be searched (hereinafter referred to as "N") (step S105). If the result of the determination is NO, the transfer control section 141 determines that the transfer of the BSP 111 has failed, and ends the process. If the result of the determination of step S105*is* YES, the transfer control section 141 adds 1 to B, sets 0 to P (step S107), and proceeds to step S102. Thus, the transfer control section 141 searches through the BSP 111 with respect to N blocks at the most. Note that the values of M and N may be fixed in the transferer 14, or may be alterable by means of a switch or the like.

Upon receiving the transfer completion notifying signal 144 from the notification section 143, the CPU controller 15 recognizes that the transfer of the BSP 111 has been properly completed, and causes the CPU activation control signal 151 to shift so as to enable operation of the CPU 10. As a result, the CPU 10 begins instruction fetches from the second storage device 12. On the other hand, if the transfer of the BSP 111 has not been properly completed, the transfer completion notifying signal 144 is not output, so that no shift in the CPU activation control signal 151 occurs, and the CPU 10 does not begin instruction fetches from the second storage device 12. Note that methods for controlling the instruction fetches by the CPU 10 by means of the CPU controller 15 include a method which controls a clock signal which is supplied to the CPU 10 (FIG. 5) and a method which controls a reset signal which is supplied to the CPU 10 (FIG. 6), for example.

Hereinafter, the details of the BSP ll will be described. The BSP 111 contains data for performing a system configuration, a main program transfer routine, and the bad block information table 113 (or a pointer to the bad block information table 113). Since the main program 112 is to be stored in the normal blocks of the first storage device 11, the bad block information table 113 may be regarded as stored position information representing the stored position of the main program 112 in the first storage device 11.

FIGS. 8A and 8B are diagrams illustrating exemplary structures of the BSP 111. The BSP 111 as shown in FIG. 8A includes a configuration section 117, a main program transfer section 118, and a bad block information table pointer 119. The configuration section 117 contains data which is necessary for performing a basic system configuration, such as data to be set in a bus controller. Based on the data contained in the configuration section 117, settings of a memory controller which are necessary for accessing the third storage device 13 are performed, for example. The main program transfer section 118 contains a main program transfer routine, including an error processing program which performs an error detection/correction process based on the second error check code 115. The bad block information table pointer 119 contains the first address of the bad block information table 113.

Alternatively, as shown in FIG. 8B, the BSP 111 may contain the bad block information table 113, instead of the bad block information table pointer 119. In the case where the structure of FIG. 8B is adopted, the size of the BSP 111 becomes larger than in the case where the structure of FIG. 8A is adopted. However, when accessing the bad block information table 113 after completion of the transfer of the BSP 111, the CPU 10 only needs to access the second storage device 12, not the first storage device 11. Therefore, in the case where the structure of FIG. 8B is adopted, the process of transferring the main program 112 to the third storage device 13 can be performed rapidly.

Figure 9:
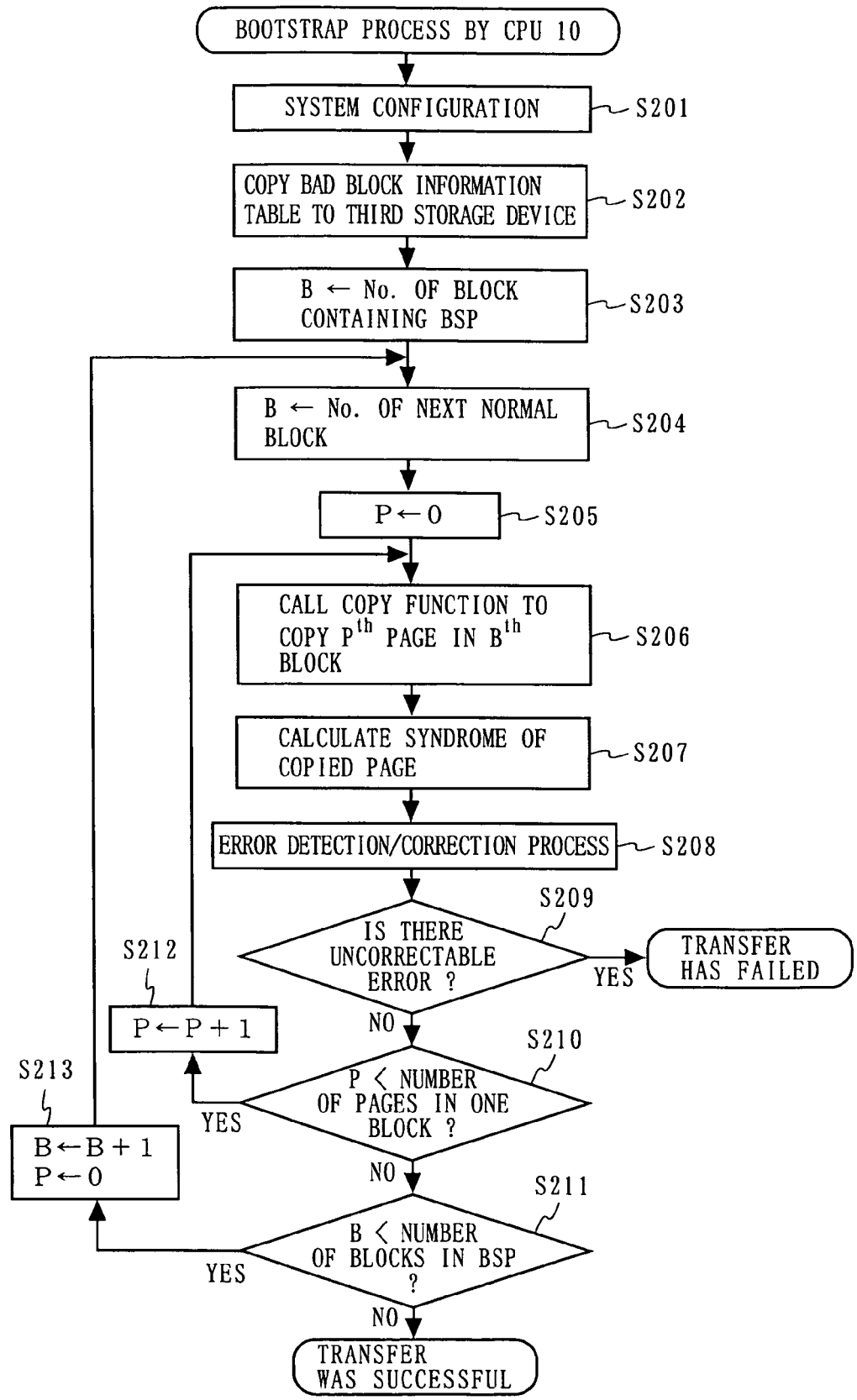
FIG. 9 is a flowchart illustrating a bootstrap process by the CPU of the information processing apparatus shown in FIG. 1.

FIG. 9 is a flowchart illustrating a bootstrap process by the CPU 10. After the transfer of the BSP 111 is completed and the transfer completion notifying signal 144 is output, the CPU 10 executes the BSP 111 on the second storage device 12 to perform the process shown in FIG. 9. In FIG. 9, variable B represents a block number which is read, and variable P represents a page number which is read.

Once the transfer of the BSP 111 is completed, the CPU 10 first performs a system configuration by using the data stored in the system configuration section 117 of the BSP 111 (step S201). At step S201, for example, various parameters are set in a memory interface circuit and the like, in order to access the third storage device 13.

Next, the CPU 10 reads the bad block information table pointer 119 from the BSP 111, and by using this, copies the bad block information table 113 from the first storage device 11 to the third storage device 13 (step S202). At this time, the error processing section 142 in the transferer 14 performs an error detection/correction process based on the first error check code 114 for the bad block information table 113 which has been read from the first storage device 11. Note that, in the case where the BSP 111 as shown in FIG. 8B is adopted, the process of step S202 is not performed because the bad block information table 113 is already stored in the second storage device 12. Next, the CPU 10 sets the number of a block containing the BSP 111 to B (step S203).

Next, by referring to the bad block information table on the third storage device 13, the CPU 10 determines the number of a next normal block and sets this number to B (step S204), and sets 0 to P (step S205). Then, the CPU 10 calls a copy function to copy the pth page in the Bth block in the first storage device 11 to a predetermined address in the third storage device 13 (step S206). Next, as a preparation for performing an error detection/correction process, the CPU 10 calculates a syndrome with respect to the page which has been copied at step S206 (step S207). Then, based on the syndrome calculated at step S207, the CPU 10 performs an error detection/correction process by software means (step S208). Through the process of step S208, any correctable error contained in the page which has been read is corrected.

Next, the CPU 10 determines whether any uncorrectable error (an error which lies beyond the correction ability) has been found during the error detection/correction process of step S208 (step S209). If the result of the determination is NO, the CPU 10 determines whether P is smaller than the number of pages in one block (step S210). If the result of the determination is YES, the CPU 10 adds 1 to P (step S212), and proceeds to step S206. If the result of the determination of step S210 is NO, the CPU 10 determines whether B is smaller than the number of blocks in the BSP 111 (step S211). If the result of the determination is YES, the CPU 10 adds 1 to B, sets 0 to P (step S213), and proceeds to step S204.

If the result of the determination at step S211 is NO, the CPU 10 determines that the transfer of the main program 112 was successful. In this case, the control of the CPU 10 branches out to the main program 112 on the third storage device 13. On the other hand, if the result of the determination of step S209 is YES, the CPU 10 determines that the transfer of the main program 112 has failed. In this case, the CPU 10 does not perform any process, and enters an infinite loop.

Thus, the CPU 10 executes the BSP 111 on the second storage device 12 to transfer the main program 112 stored in the normal blocks of the first storage device 11 to the third storage device 13. Thereafter, if the transfer of the main program 112 turns out successful, the CPU 10 proceeds to execute the main program 112 on the third storage device 13; if the transfer of the main program 112 fails, the CPU 10 stops operating.

As described above, in accordance with the information processing apparatus 1, system boot can be stably performed by using programs having check codes assigned thereto and being stored in a low-reliability memory (such as a NAND type flash memory), without employing a high-reliability memory (such as a ROM) for storing an initial program. Since a main program stored in the first storage device is transferred to the second storage device in accordance with a bootstrap program stored in the second storage device and an error detection/correction process based on the second check code is performed, it is possible to perform an intricate software-based error detection/correction process for the main program.

Figure 10:
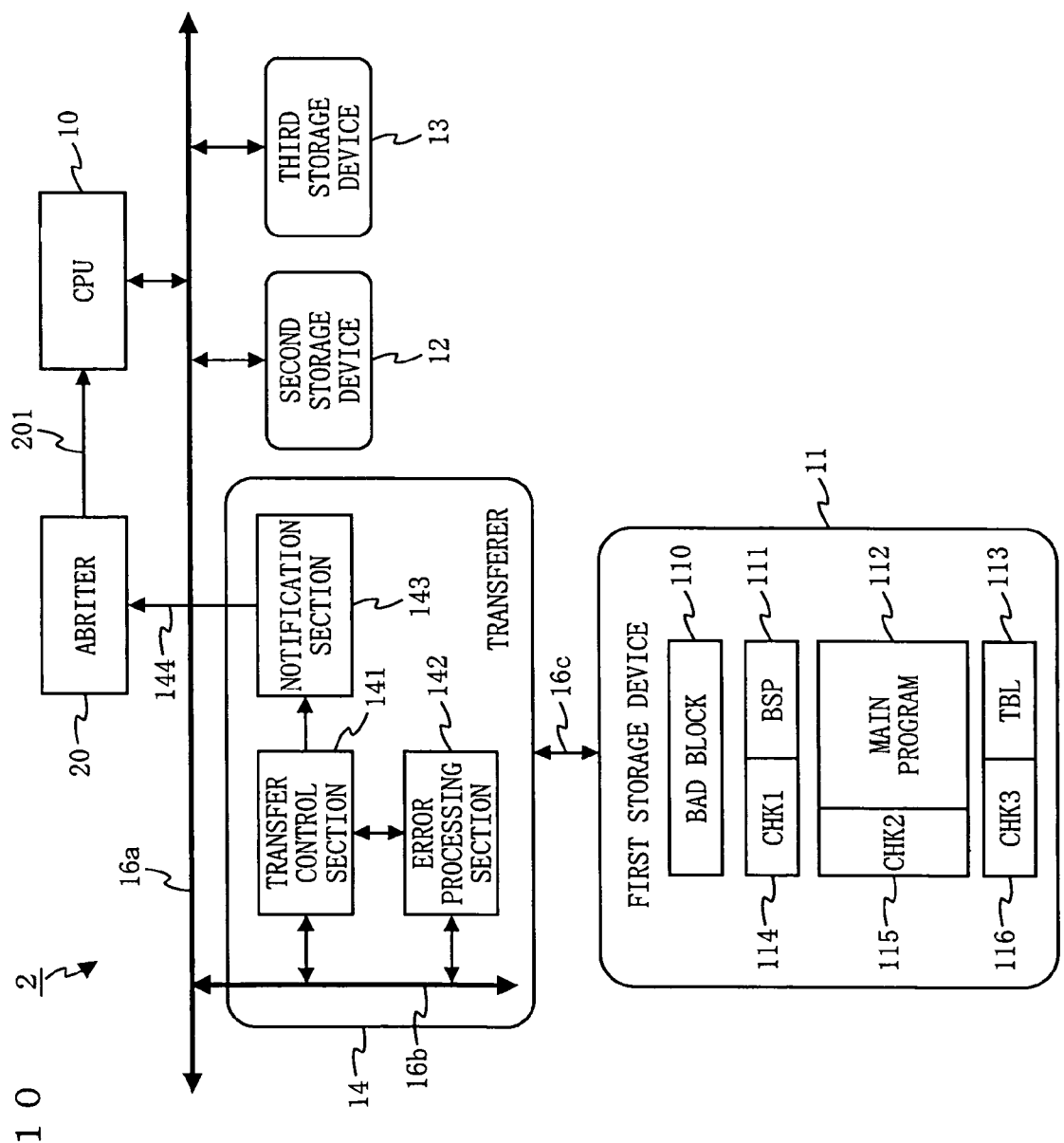
FIG. 10 is a diagram illustrating the structure of a variant of the information processing apparatus according to the first embodiment of the present invention.

In the information processing apparatus 1 described above, instruction fetches by the CPU 10 are controlled by the CPU controller 15. Alternatively, as exemplified by an information processing apparatus 2 shown in FIG. 10, instruction fetches by the CPU 10 may be controlled by employing an arbiter 20 for the data bus 16a. In FIG. 10, the arbiter 20 arbitrates an access right to the data bus 16a which is necessary for accessing the second storage device 12. More specifically, after power activation, the arbiter 20 grants the access right to the data bus 16a to the transferer 14 with a higher priority, until the transfer completion notifying signal 144 is output. Once the transfer of the BSP 11 is completed so that the transfer completion notifying signal 144 is output, the arbiter 20 grants the access right to the data bus 16a to the CPU 10 with a higher priority.

As a result, although the CPU 10 immediately tries to fetch instructions from the second storage device 12 after power activation, the arbiter 20 acts so that the CPU 10 does not have an access right to the data bus 16a, i.e., cannot access the second storage device 12, until completion of the transfer of the BSP 111. Thus, completion of the transfer of the BSP 111 must be awaited before instruction fetches by the CPU 10 can be commenced. As such, the information processing apparatus 2 provides the same effects as those provided by the information processing apparatus 1.

The information processing apparatus 1 adopts a bad block detection method which sequentially searches the BSP 111 from the first block in the first storage device 11 and detects a bad block based on whether an uncorrectable error is detected during a transfer of M pages. However, this method may mistake a bad block for a normal block if a value which fortuitously passes the error detection/correction process happens to be stored in the bad block as initial value data at shipment. In order to solve this problem, when performing writes to the first storage device 11, data which contains an uncorrectable error may be repeatedly written to bad blocks. As a result, uncorrectable errors will surely be detected during a transfer of M pages, whereby the problem of mistaking a bad block for a normal block can be avoided.

Second Embodiment

Figure 11:
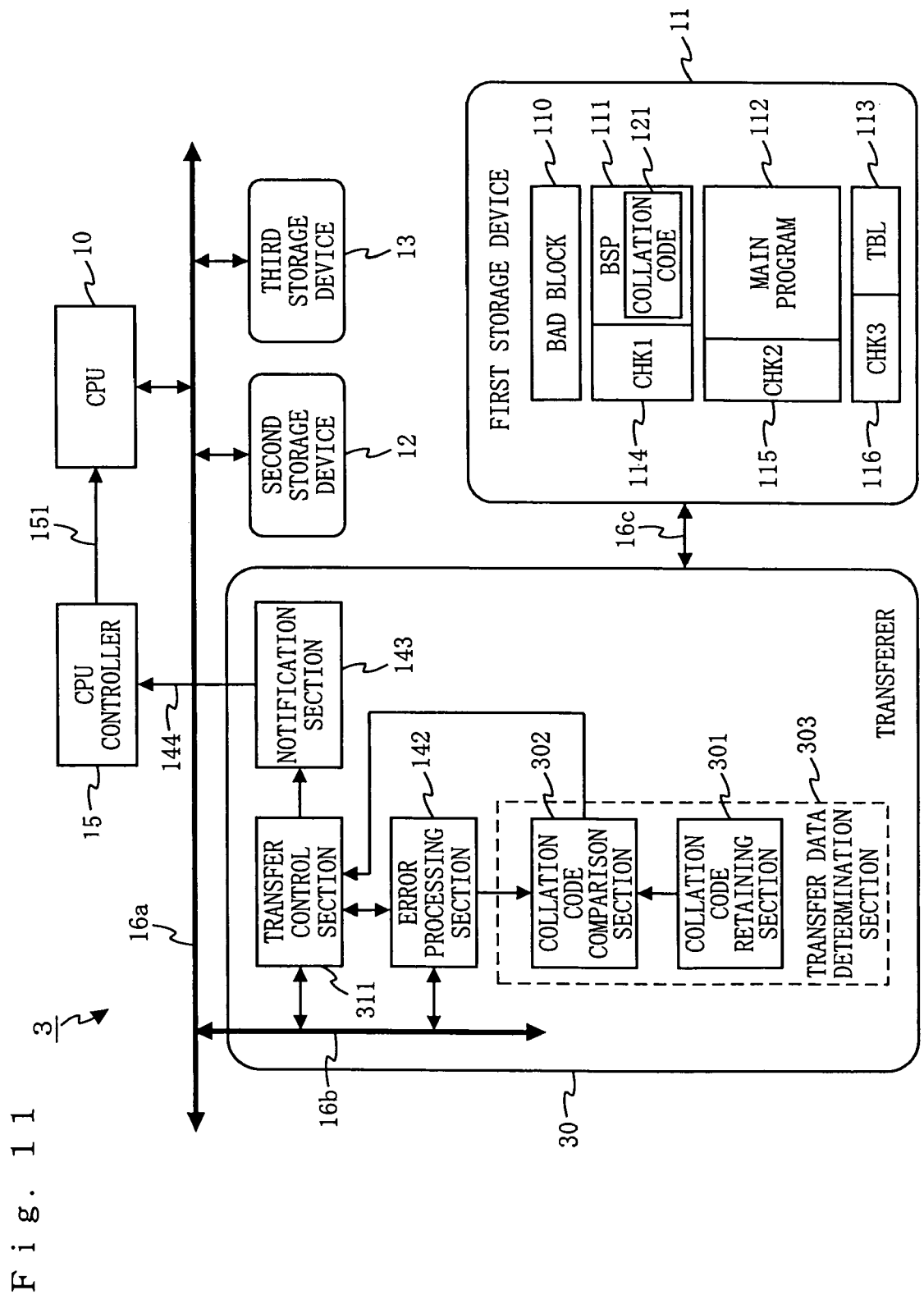
FIG. 11 is a diagram illustrating the structure of an information processing apparatus according to a second embodiment of the present invention.

FIG. 11 is a diagram illustrating the structure of an information processing apparatus according to a second embodiment of the present invention. The information processing apparatus 3 shown in FIG. 11 is identical to the information processing apparatus 1 (FIG. 1) of the first embodiment except that the transferer 14 is replaced by a transferer 30 and a collation code 121 is added to the BSP 111. The information processing apparatus 3 solves the problem of mistaking a bad block for a normal block by using the collation code 121.

The transferer 30 is identical to the transferer 14 of the first embodiment except that the transfer control section 141 is replaced by a transfer control section 311 and a transfer data determination section 303, which includes a collation code retaining section 301 and a collation code comparison section 302, is added. The collation code retaining section 301 stores a collation code which is uniquely determined in the system. Although there are no particular limitations to the value to be used as the collation code, it is desirable to use a characteristic value (e.g., a value which consists of a mixture of "0" bits and "1" bits) for distinction over any other values. In the present embodiment, a 2-byte collation code "5a3c" (hexadecimal) is used, for example.

When the BSP 111 is written to the first storage device 11, the same collation code 121 as a collation code which is retained in the collation code retaining section 301 is assigned to the BSP 111. FIG. 12 is a diagram which, similarly to FIG. 3, illustrates the format of the BSP 111 having the collation code 121 assigned thereto as well as the first error check code 114. The BSP 111 is stored over a plurality of pages of one or more normal blocks in the first storage device 11. In the last 4 bytes of each page's data (512 bytes) in which a portion of the BSP 111 is stored, the collation code 121 is stored with an error check code. More specifically, the 2-byte collation code 121 is divided into four groups of 4 bits, and each of these groups is stored as the lower 4 bits of the last 4 bytes of each page. For every 4 bits of the collation code 121, a 4-bit error check code is calculated by using eq. 1, and stored as the upper 4 bits of the last 4 bytes of each page, as the error check code 122 for the collation code. For example, if the collation code has a value "5a3c" (hexadecimal), it follows that: M[15]=0; M[14]=1; M[13]=0; M[12]=1; P[2047]=1; P[2046]=1; P[2045]=0; P[2044]=0; and so on.

Figure 13:
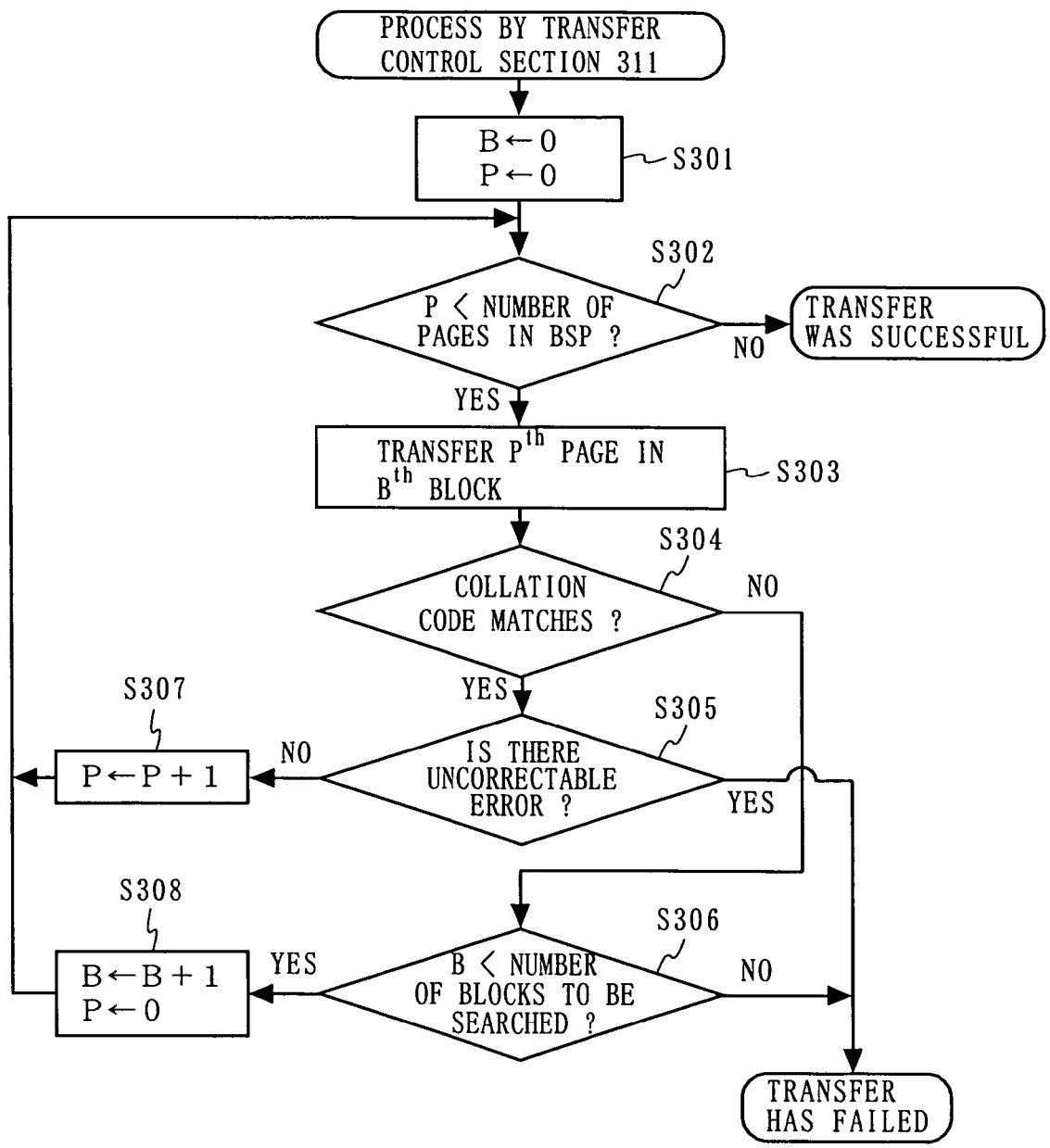
FIG. 13 is a flowchart illustrating an operation of a transferer in the information processing apparatus shown in FIG. 11.

FIG. 13 is a flowchart which, similarly to FIG. 7, illustrates an operation of the transfer control section 311 after power activation. As is the case with the transfer control section 141 in the first embodiment, in accordance with the procedure shown in FIG. 13, the transfer control section 311 obtains the stored position of the BSP 111 in the first storage device 11, sequentially reads the BSP 111 from this stored position page by page, and transfers the BSP 111 to the second storage device 12. Again, it is assumed that the size of the BSP 111 is one block or less. Meanings of variables B and P are the same as those defined for FIG. 7.

Once power is activated, the transfer control section 311 initializes B and P to 0 (step S301). Next, the transfer control section 311 determines whether P is smaller than the size M of the BSP 111 (step S302). If the result of the determination is NO, the transfer control section 311 determines that the transfer of the BSP 111 was successful, and ends the process. In this case, the CPU controller 15 outputs a transfer completion notifying signal 144.

If the result of the determination of step S302 is YES, the transfer control section 311 reads the $p^{th}$ page in the $B^{th}$ block in the first storage device 11, and transfers this page to a predetermined address in the second storage device 12 (step S303). At this time, the error processing section 142 performs the same error detection/correction process as that of step S102 in FIG. 7. The collation code comparison section 302 compares the collation code 121 stored in the last 4 bytes of the data (512 bytes) of the transferred page against the collation code (i.e., a reference value which the collation code should take) retained in the collation code retaining section 301.

Next, the transfer control section 311 determines whether the collation code comparison section 302 has found that the collation code 121 matches the reference value for the collation code (step S304). If the result of the determination is YES, the transfer control section 311 determines whether an uncorrectable error has been detected during the transfer of one page at step S303 (step S305). If the result of the determination is NO, the transfer control section 311 adds 1 to P (step S307), and proceeds to step S302.

If the result of the determination of step S304 is NO, the transfer control section 311 determines whether B is smaller than the number N of blocks to be searched (step S306). If the result of the determination is YES, the transfer control section 311 adds 1 to B, sets 0 to P (step S308), and proceeds to step S302.

If the result of the determination of step S305 is YES, or if the result of the determination of step S306 is NO, the transfer control section 311 determines that the transfer of the BSP 111 has failed, and ends the process. In this case, the CPU controller 15 does not output the transfer completion notifying signal 144.

Whether the transfer of the bootstrap program turns out successful or fails, the information processing apparatus 3 operates similarly to the information processing apparatus 1 of the first embodiment. Therefore, the information processing apparatus 3 provides the same effects as those provided by the information processing apparatus 1 of the first embodiment. In addition, the use of the collation code solves the problem of mistaking a bad block for a normal block, and enables a quick detection of the bootstrap program stored in the first storage device, which presumably contains a bad block(s).

In the information processing apparatus 3, the CPU controller 15 shown in FIG. 5 or FIG. 6, or the arbiter 20 shown in FIG. 10 may alternatively be employed to control instruction fetches by the CPU 10. This is also true for the third to fifth embodiments described below.

Figure 14:
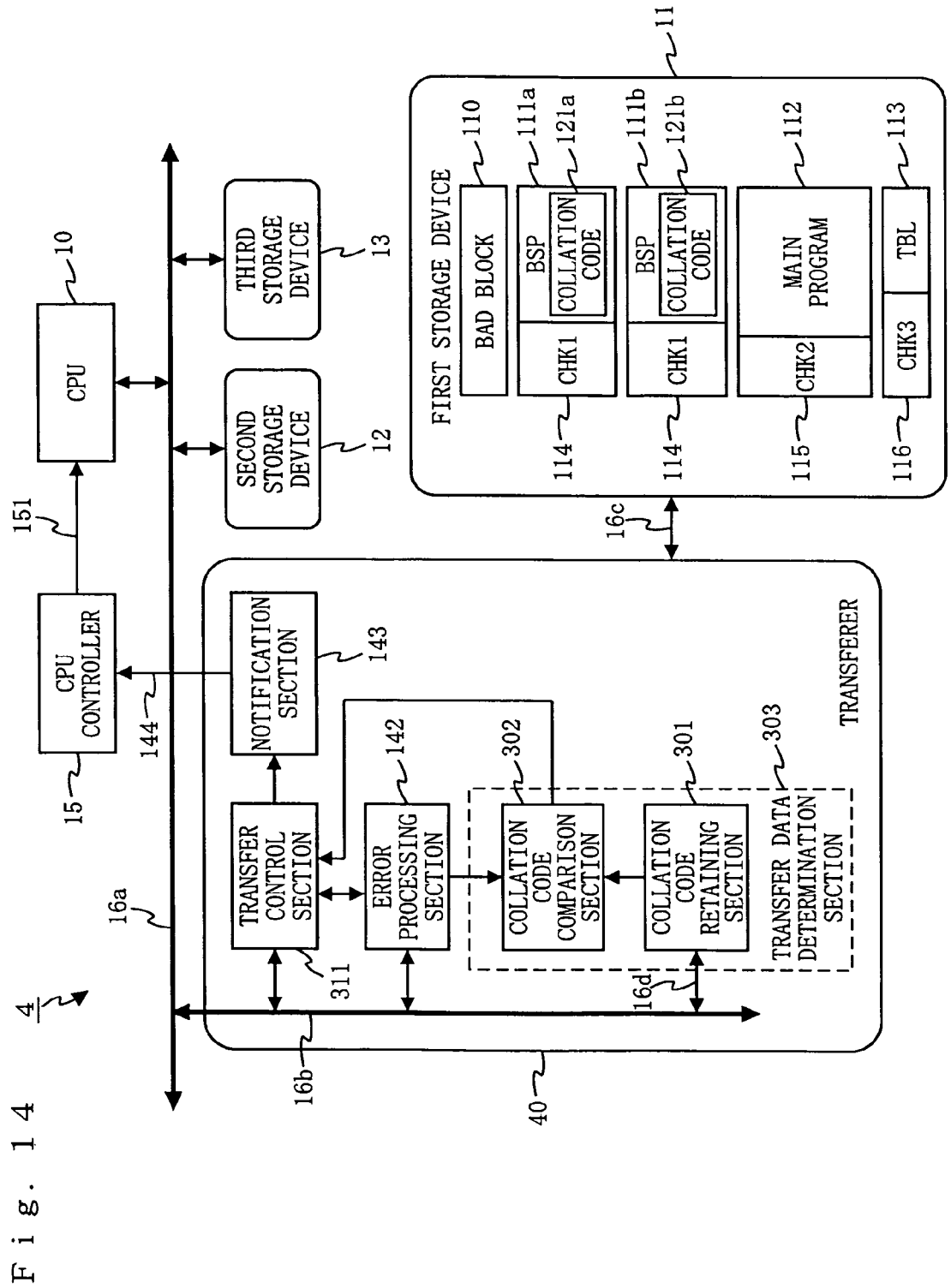
FIG. 14 is a diagram illustrating a variant of the information processing apparatus according to the second embodiment of the present invention.

The information processing apparatus may comprise a transferer which allows the collation code to be rewritten from the outside, as exemplified by an information processing apparatus 4 shown in FIG. 14. In FIG. 14, the transferer 40 is constructed so that data can be written to the collation code retaining section 301 via the data bus 16d. The first storage device 11 stores: two types of BSPs 111a and 111b; and first error check codes 114a and 114b which are calculated, by using the same method, with respect to the two types of BSPs. The BSP 111a and the first error check code 114a would correspond to the BSP 111 and the first error check code 114 in the information processing apparatus 3 shown in FIG. 11. The BSP 111b is a different BSP from the BSP 111a, e.g., a BSP for a CPU of a different revision, or a BSP for an information processing apparatus having a different system configuration. The BSPs 111a and 111b are stored in the first storage device 11 with the collation codes 121a and 121b respectively assigned thereto. A different value from that of the collation code 121a is to be used for the collation code 121b.

The collation code retained in the collation code retaining section 301 (i.e., the reference value which the collation code should take) can be rewritten according to the revision of the CPU 10 or the system configuration. Once power is activated, the transferer 40 selects either the BSP 111a or the BSP 111b in accordance with the collation code retained in the collation code retaining section 301, and transfers the selected BSP to the second storage device 12. The CPU 10 operates in accordance with the BSP 111a or the BSP 111b on the second storage device 12. Thus, even in the presence of different CPU revisions or system configurations, etc., system boot can be properly performed by using an optimum BSP which is selected from within the single first storage device 11 in accordance with the CPU revision, system configuration, etc. Although the information processing apparatus 4 above is illustrated as calculating the first error check codes 114a and 114b for the BSPs 111a and 111b by using the same method, they may be calculated by different methods; in this case, an error detection/correction for each error check code is to be performed by the error processing section 142.

Third Embodiment

Figure 15:
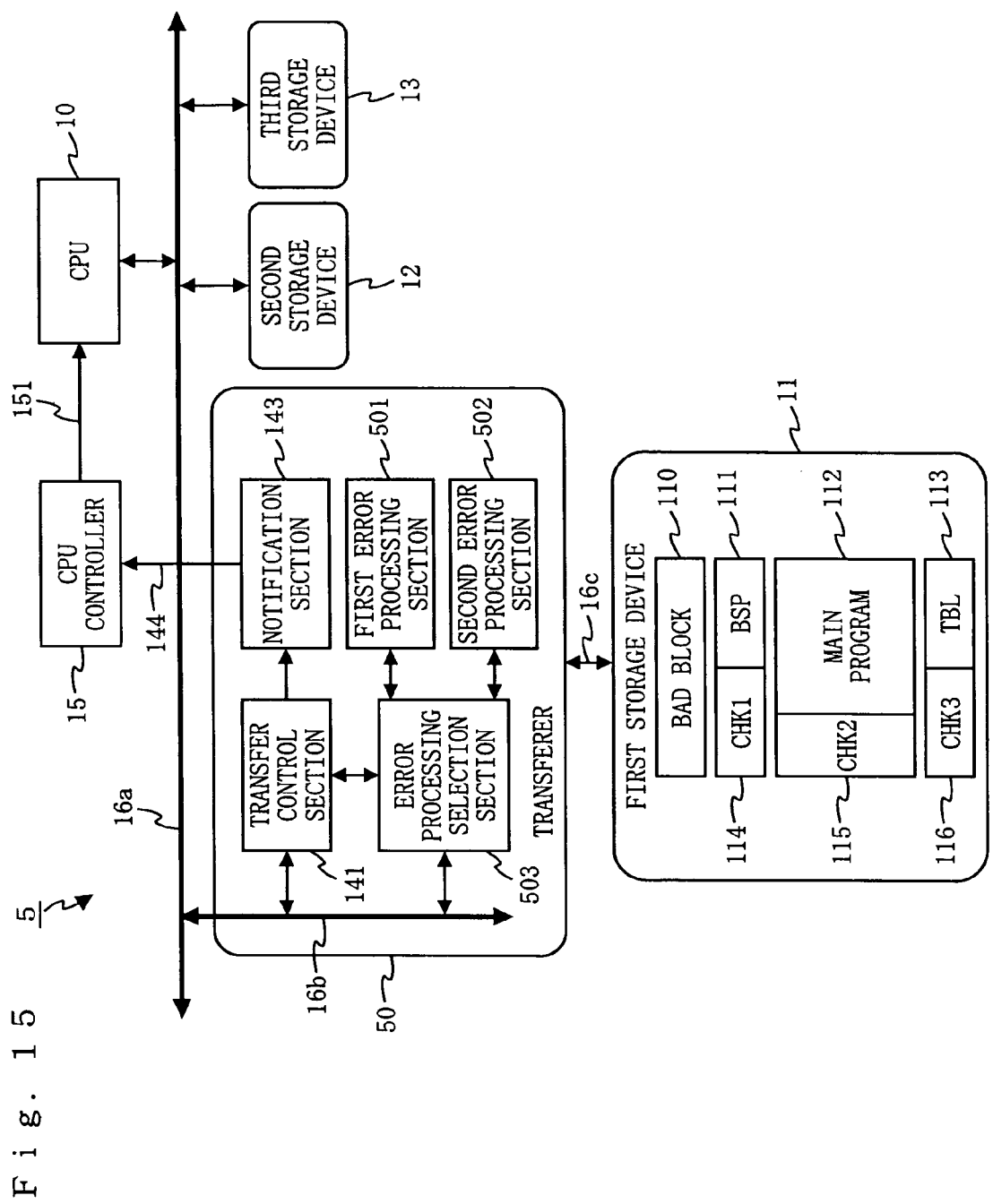
FIG. 15 is a diagram illustrating the structure of an information processing apparatus according to a third embodiment of the present invention.

FIG. 15 is a diagram illustrating the structure of an information processing apparatus according to a third embodiment of the present invention. The information processing apparatus 5 shown in FIG. 15 is identical to the information processing apparatus 1 (FIG. 1) of the first embodiment except that the transferer 14 is replaced by a transferer 50. The information processing apparatus 5 is characterized in that a portion of the error detection/correction process for the main program 112 is performed in the transferer 50.

The transferer 50 is identical to the transferer 14 of the first embodiment except that the error processing section 142 is replaced by first and second error processing sections 501 and 502 and an error processing selection section 503. The first error processing section 501 performs an error detection/correction process based on the first and third error check codes 114 and 116. The error detection/correction process in the first error processing section 501 is performed by a predetermined unit of processing (8 bits in the present example) using eq. 2, for example.

The second error processing section 502 performs a portion of the error detection/correction process based on the second error check code 115. Assuming that the second error check code 115 is a 16-byte error check code which is calculated based on 512 bytes of data, the error detection/correction process based on the second error check code 115 will entail more calculation than the calculation amount for the first and third error check codes 114 and 116. Therefore, if the second error processing section 502 were to perform all of the error detection/correction process based on the second error check code 115, the transferer 50 would require an increased amount of hardware, thus leading to an increase in the cost of the information processing apparatus 5. Accordingly, within the error detection/correction process based on the second error check code 115, the second error processing section 502 only handles syndrome calculation. An error detection/correction process using the calculated syndrome is to be performed through software processing by the CPU 10.

Under the control of the CPU 10, the error processing selection section 503 selectively causes either one of the first and second error processing sections 501 and 502 to operate. The error processing selection section 503 includes a register to which the CPU 10 can write a value. In this register, the value "0", for example, is stored until completion of the transfer of the BSP 111. Once the transfer of the BSP 111 is completed, the CPU 10 updates the value of the aforementioned register in the error processing selection section 503 to "1", for example. If the value of the register is "0", the error processing selection section 503 supplies the data which is read from the first storage device 11 to the first error processing section 501. If the value of the register is "1", the error processing selection section 503 supplies the data which is read from the first storage device 11 to the second error processing section 502.

Thus, in the transferer 50, after power is activated, an error detection/correction process based on the first error check code 114 is performed for the BSP 111 to be transferred, until the value of the register in the error processing selection section 503 shifts to "1". The value of the register in the error processing selection section 503 shifts to "1" when the CPU 10 executes a predetermined instruction. Thereafter, within the error detection/correction process based on the second error check code 115 which is performed for the main program 112 to be transferred, the syndrome calculation takes place in the transferer 50.

Thus, in accordance with the information processing apparatus 5, a portion of the error detection/correction process is handled by the transferer, thereby allowing for a rapid execution of the error detection/correction process for the main program, and hence the system boot.

Figure 16:
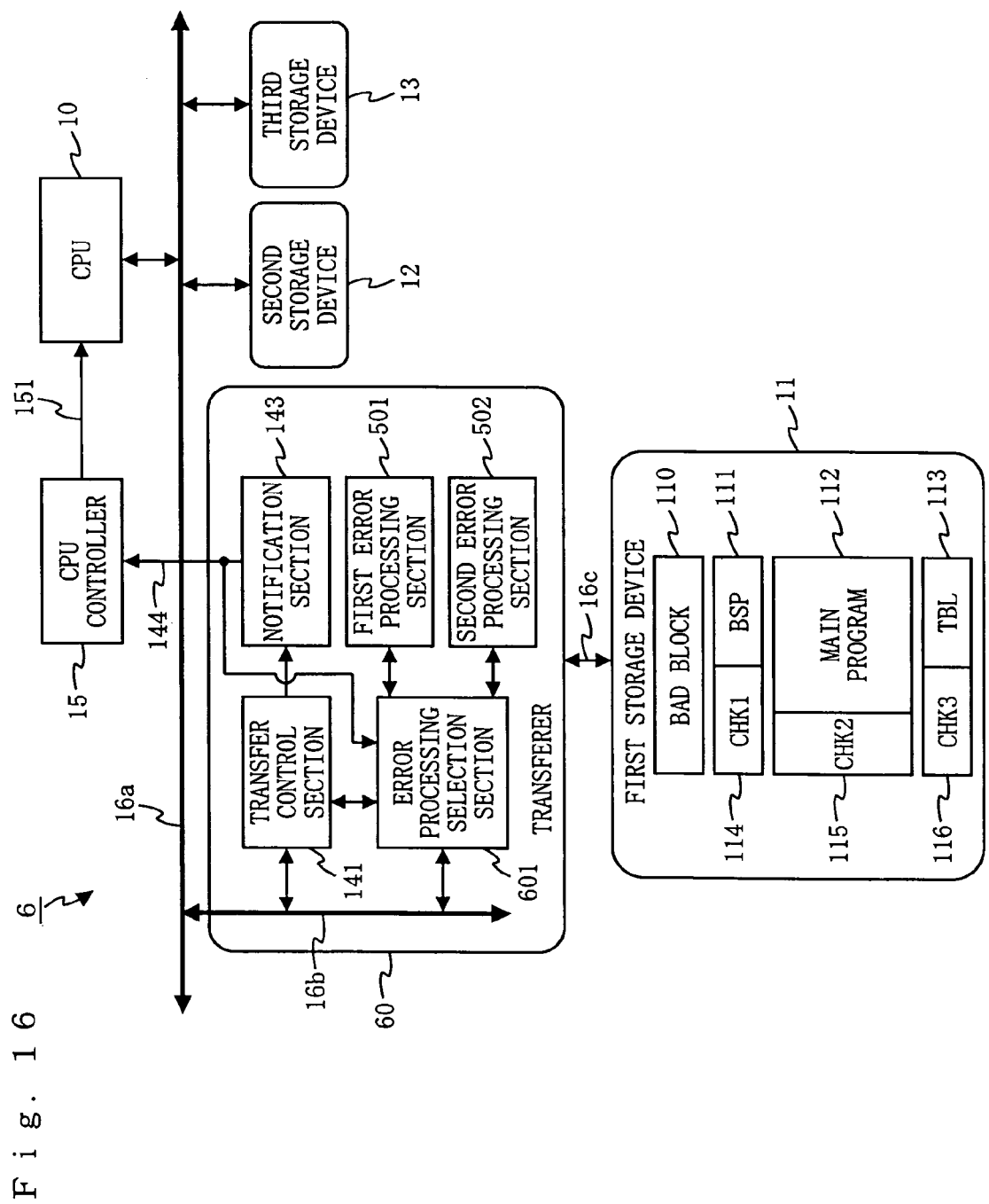
FIG. 16 is a diagram illustrating a variant of the information processing apparatus according to the third embodiment of the present invention.

In the information processing apparatus 5 illustrated above, the value of the register in the error processing selection section 503 is rewritten with an instruction from the CPU 10. Alternatively, as exemplified by an information processing apparatus 6 shown in FIG. 16, an error processing selection section 601 in a transferer 60 may switch the value of the aforementioned register from "0" to "1" in synchronization with a transfer completion notifying signal 144 received from the notification section 143.

Fourth Embodiment

Figure 17:
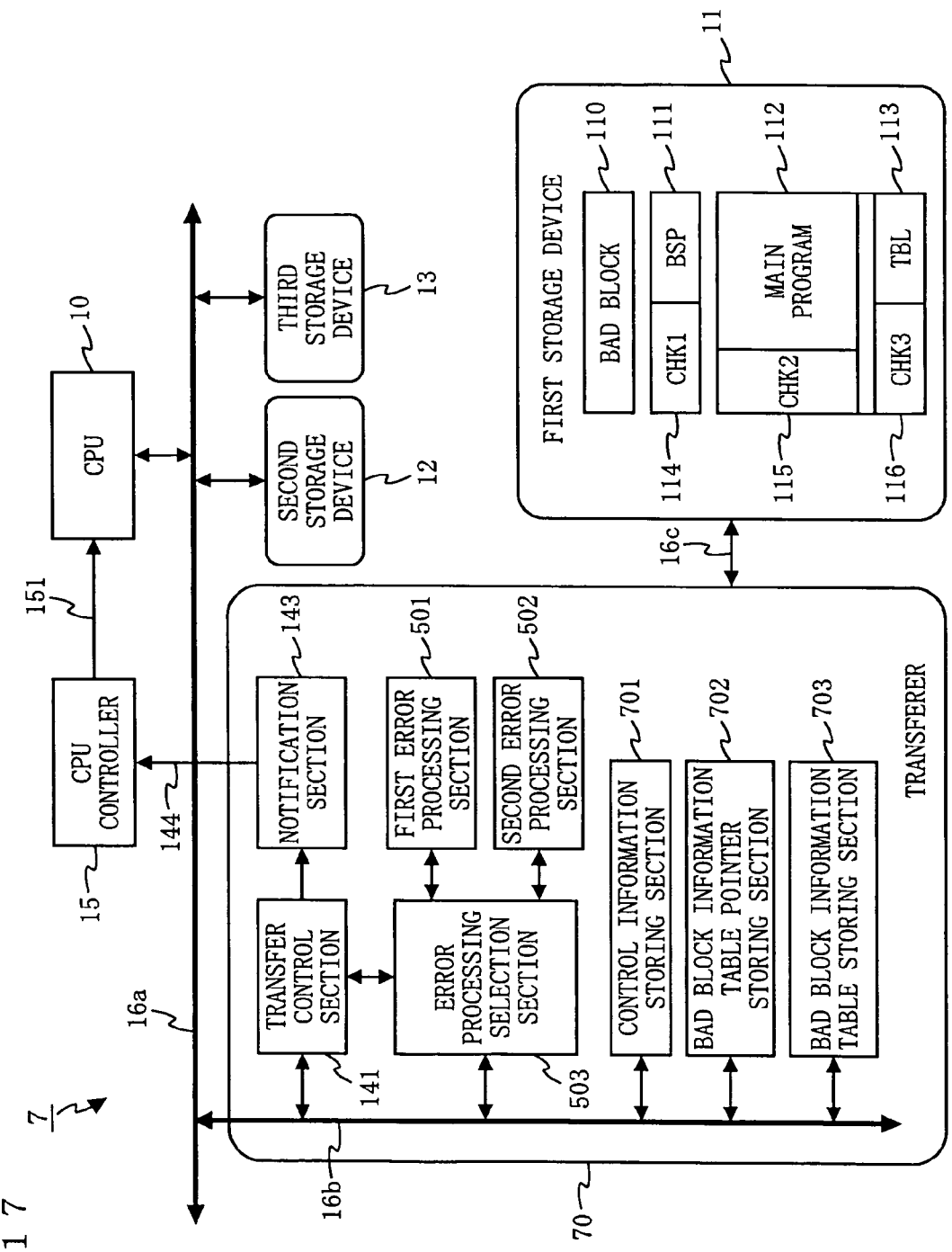
FIG. 17 is a diagram illustrating the structure of an information processing apparatus according to a fourth embodiment of the present invention.

FIG. 17 is a diagram illustrating the structure of an information processing apparatus according to a fourth embodiment of the present invention. The information processing apparatus 7 shown in FIG. 17 is identical to the information processing apparatus 5 (FIG. 15) of the third embodiment except that the transferer 50 is replaced by a transferer 70. The information processing apparatus 7 is characterized in that the transferer 70 has a function of transferring the main program 112.

The transferer 70 is identical to the transferer 50 (FIG. 15) of the third embodiment except that the transferer 70 additionally includes a control information storing section 701, a bad block information table pointer storing section 702, and a bad block information table storing section 703. The control information storing section 701 stores a transfer source address, a transfer size, a transfer destination address, and the like. The bad block information table pointer storing section 702 stores a bad block information table pointer 119 (the first address of the bad block information table 113) which is contained in the BSP 111.

A third error check code 116 which is calculated by the same method as that for the BSP 111 is assigned to the bad block information table 113. Under the control of the CPU 10, the transferee 70 reads the bad block information table 113 and the third error check code 116 from the first storage device 11, subjects them to an error detection/correction process by means of the first error processing section 501, and writes to the second storage device 12 the bad block information table which has been subjected to the error detection/correction process.

In the present embodiment, the second error processing section 502 performs the entirety of the error detection/correction process based on the second error check code. In this case, if an uncorrectable error is detected while performing an error detection/correction process for the main program 112, the second error processing section 502 stops the error processing, and notifies to the CPU 10 (by using a means which is not shown in the figure) that an irrecoverable error has been detected. Upon receiving this notification, the CPU 10 performs an abnormality handling process. For example, the CPU 10 may abort the system, and notify to the user that an irrecoverable error has occurred by displaying a message on a display means (not shown).

Figure 18:
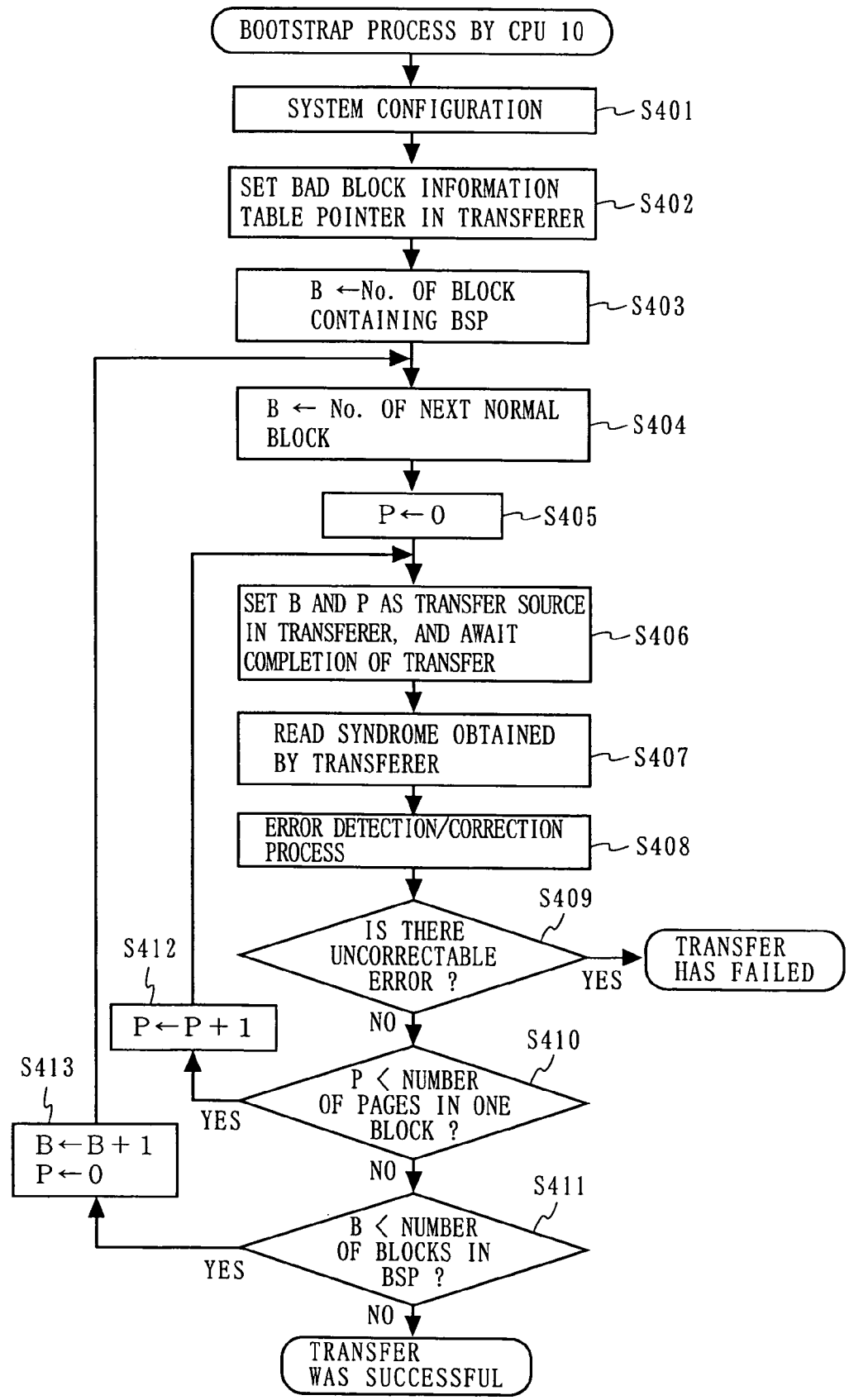
FIG. 18 is a flowchart illustrating a bootstrap process by the CPU of the information processing apparatus shown in FIG. 17.

FIG. 18 is a flowchart illustrating a bootstrap process by the CPU 10 according to the present embodiment. Since the flowchart shown in FIG. 18 is similar to the flowchart shown in FIG. 9, only the differences therebetween will be described below.

In the flowchart shown in FIG. 9, the CPU 10 reads the bad block information table pointer 119 from the BSP 111, and uses the bad block information table pointer 119 to copy the bad block information table 113 from the first storage device 11 to the third storage device 13 (step S202). On the other hand, in the flowchart shown in FIG. 18, the CPU 10 reads the bad block information table pointer 119 from the BSP 111, and writes the bad block information table pointer 119 to the bad block information table pointer storing section 702 of the transferer 70 (step S402). At this time, by referring to the bad block information table pointer stored in the bad block information table pointer storing section 702, the transferer 70 reads the bad block information table 113 and the third error check code 116 from the first storage device 11, subjects them to an error detection/correction process based on the first error check code 114, and writes the result of the process to the bad block information table storing section 703.

Moreover, in the flowchart shown in FIG. 9, the CPU 10 calls a copy function to copy a page to the third storage device 13 (step S206), and calculates a syndrome for the copied page (step S207). On the other hand, in the flowchart shown in FIG. 18, the CPU 10 writes parameters which are necessary for the transfer (e.g., values of B and P as a transfer source) to the control information storing section 701 of the transferer 70, and awaits the completion of transfer by the transferer 70 (step S406). At this time, the transfer control section 141 transfers the $p^{th}$ page in the $B^{th}$ block in the first storage device 11, as designated by the parameters stored in the control information storing section 701, to a predetermined address in the second storage device 12, and the second error processing section 502 calculates a syndrome for the transferred page. When the transfer of one page is completed, the CPU 10 reads the syndrome which has been calculated in the second error processing section 502 (step S408). The error detection/correction process of step S409 is performed based on the syndrome which has been read.

Thus, in accordance with the information processing apparatus 7, the size of the bootstrap program can be reduced, and the load on the CPU can be reduced, thereby enabling a rapid execution of a system boot.

Fifth Embodiment

Figure 19:
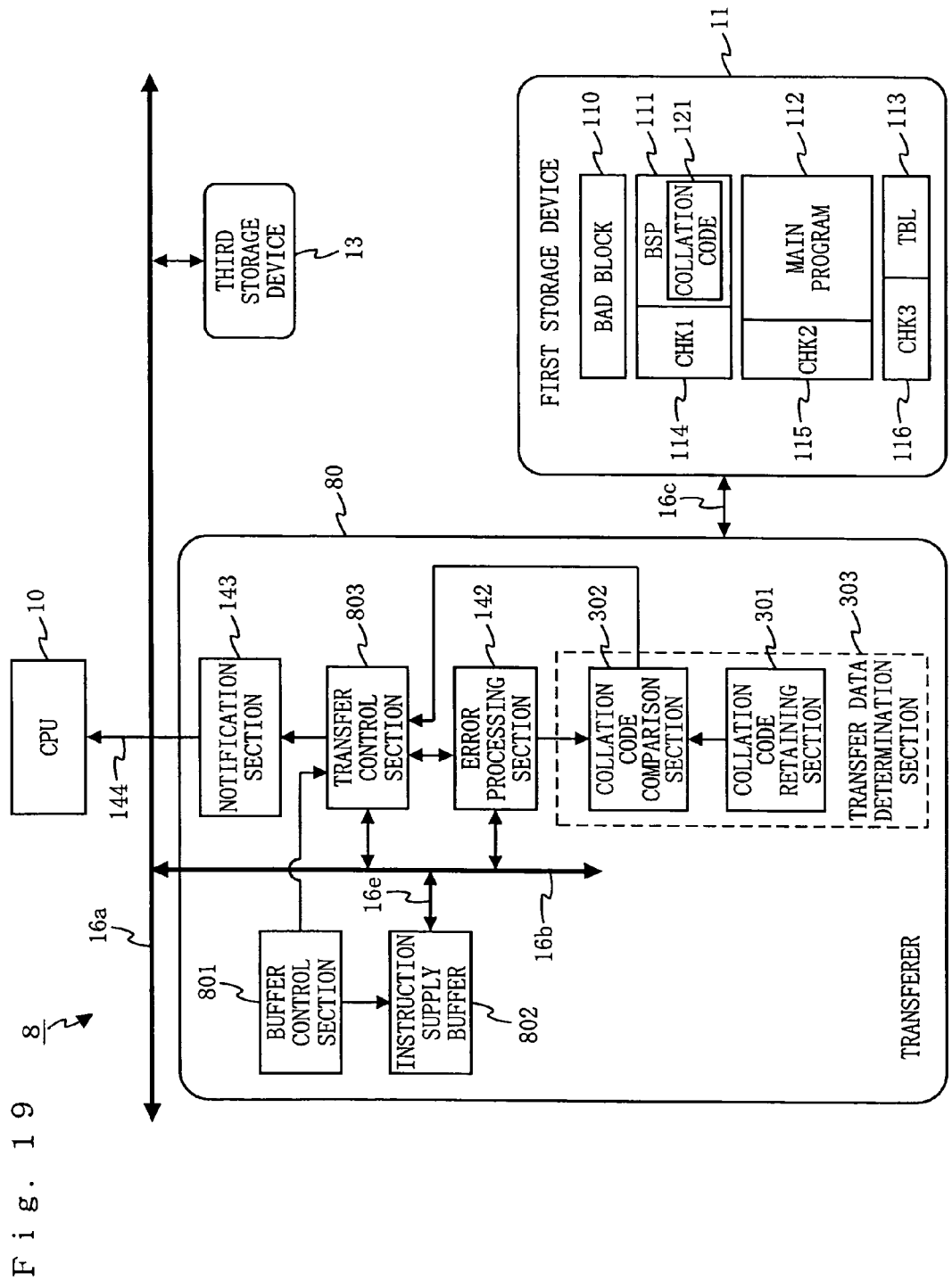
FIG. 19 is a diagram illustrating the structure of an information processing apparatus according to a fifth embodiment of the present invention.

FIG. 19 is a diagram illustrating the structure of an information processing apparatus according to a fifth embodiment of the present invention. The information processing apparatus 8 shown in FIG. 19 is identical to the information processing apparatus 3 (FIG. 11) of the third embodiment except that the second storage device 12 is eliminated and the transferer 30 is replaced by a transferer 80. The information processing apparatus 8 is characterized in that it lacks a dedicated storage device for storing the BSP 111, and that the BSP 111 is supplied from the transferer 80.

The transferer 80 is identical to the transferer 30 (FIG. 11) of the third embodiment except that the transfer control section 311 is replaced by a transfer control section 803 and a buffer control section 801 and an instruction supply buffer 802 are added. The instruction supply buffer 802 is a buffer for storing a predetermined number of instructions. Once power is activated, the transfer control section 803 sequentially reads a predetermined amount of the BSP 111 from the beginning of the first storage device 11, and the error processing section 142 performs an error detection/correction process for the predetermined amount of the BSP 111 that has been read. The BSP 111 which has been subjected to the error detection/correction is stored to the instruction supply buffer 802 via the data buses 16c, 16b, and 16e. Once power is activated, the CPU 10 tries to fetch instructions from the instruction supply buffer 802.

If a next instruction is already stored in the instruction supply buffer 802 when the CPU 10 has attempted an instruction fetch, the buffer control section 801 allows the CPU 10 to read out that instruction. In this case, the CPU 10 succeeds in the instruction fetch, and executes the fetched instruction. On the other hand, if a next instruction is not yet stored in the instruction supply buffer 802 when the CPU 10 has attempted an instruction fetch, the buffer control section 801 halts the instruction fetch by the CPU 10, and controls the transfer control section 803 to read the next instruction from the first storage device 11. The instruction which has been read is subjected to an error detection/correction process, and thereafter stored in the instruction supply buffer 802. Through such control, the transferer 80 ensures that, if a next instruction is not yet stored in the instruction supply buffer 802, the CPU 10 cannot perform an instruction fetch until the next instruction becomes ready.

Thus, in accordance with the information processing apparatus 8, the same effects as those provided by the information processing apparatus of the first embodiment can be provided without securing a memory area for storing the BSP.

Sixth Embodiment

Figure 20:
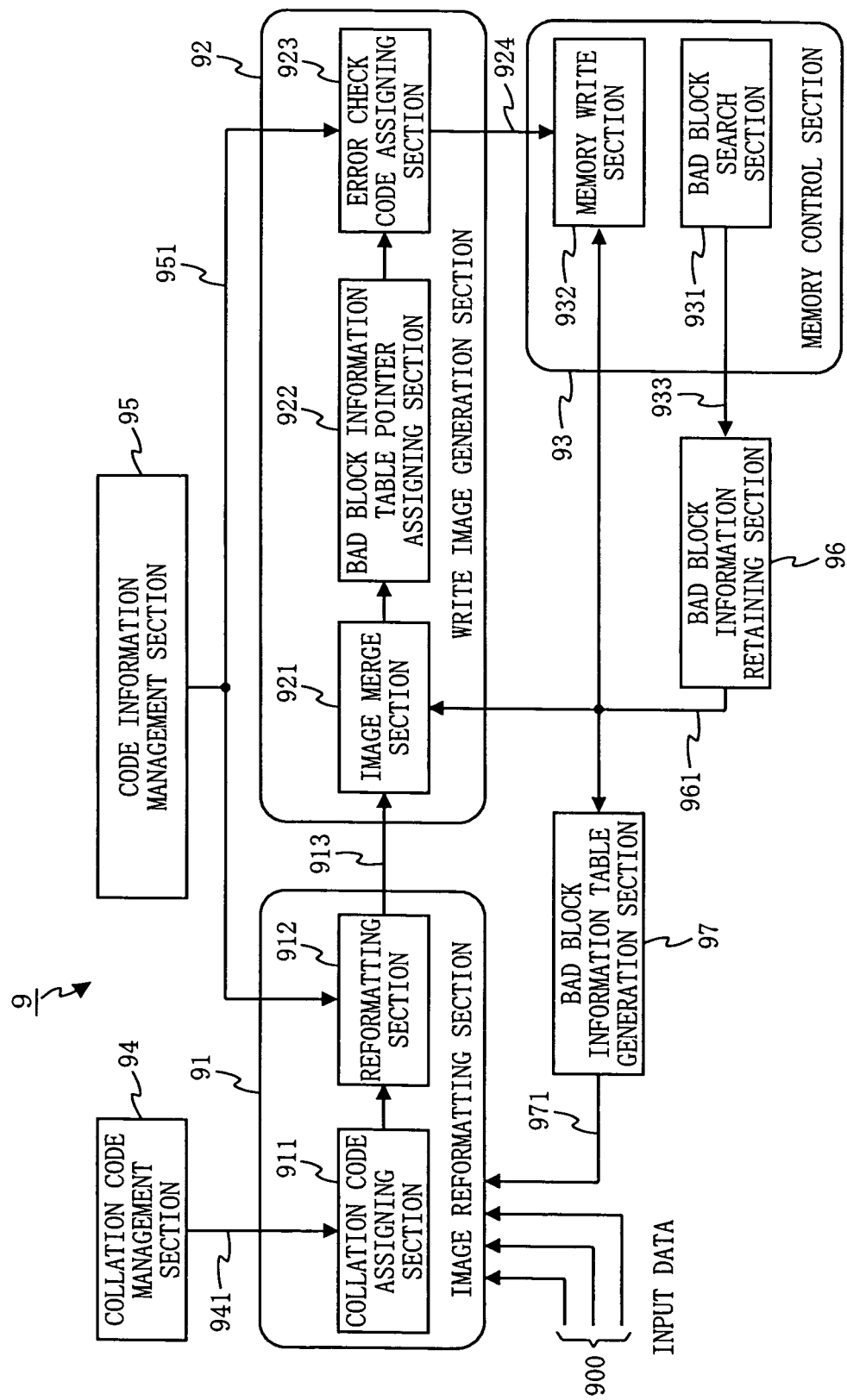
FIG. 20 is a diagram illustrating the structure of a ROM image generation apparatus according to a sixth embodiment of the present invention.

FIG. 20 is a diagram illustrating the structure of a ROM image generation apparatus according to a sixth embodiment of the present invention. The ROM image generation apparatus 9 shown in FIG. 20 is an apparatus which writes a ROM image including the BSP 111, the main program 112, and the like, to a memory (hereinafter referred to as "target memory") which is used as the first storage device 11 included in an information processing apparatus according to any one of the above-described embodiments.

The ROM image generation apparatus 9 comprises an image reformatting section 91, a write image generation section 92, a memory control section 93, a collation code management section 94, a code information management section 95, a bad block information retaining section 96, and a bad block information table generation section 97. The image reformatting section 91 includes a collation code assigning section 911 and a reformatting section 912. The write image generation section 92 includes an image merge section 921, a bad block information table pointer assigning section 922, and an error check code assigning section 923. The memory control section 93 includes a bad block search section 931 and a memory write section 932.

Prior to the inputting of input data 900, the collation code management section 94 stores a collation code 941 (which is to be written as an assignment to the input data 900), and the code information management section 95 stores error check code assignment information 951 indicating which method is to be used in calculating error check codes for each type of input data 900. The bad block search section 931 accesses the target memory with a predetermined method, and outputs bad block information 933 indicating the position(s) of a bad block(s) contained in the target memory. The bad block information 933 which is output from the bad block search section 931 is stored to the bad block information retaining section 96.

As the input data 900, a BSP, a main program, etc., (which are in a binary form) to be written to the target memory are input as separate files to the ROM image generation apparatus 9. Based on the bad block information 961 retained in the bad block information retaining section 96, the bad block information table generation section 97 generates the bad block information table 971 in a binary form. The input data 900 and the bad block information table 971 are input to the image reformatting section 91 in the form of separate files.

The image reformatting section 91 reformats the input data 900 and the bad block information table 971 into a suitable form for being written to the target memory. More specifically, the collation code assigning section 911 assigns the collation code 941 stored in the collation code management section 94 to the input data 900, as necessary. In accordance with the error check code assignment information 951 stored in the code information management section 95, the reformatting section 912 reformats the input data 900 and the bad block information table 971 each into a form which can suitably accept an error check code to be assigned thereto, and outputs the results as separate files. The data which has been reformatted by the image reformatting section 91 will be referred to as reformatting section outputs 913.

FIGS. 21A and 21B are diagrams illustrating exemplary reformatting section outputs 913. FIG. 21A shows a reformatting section output 913 in the case where the BSP 11 is input. FIG. 21B shows a reformatting section output 913 in the case where the main program 112 is input. While the BSP 111 is being input, the code information management section 95 keeps outputting an error check code assignment information 951 which indicates that a reformatting to a form in which a 4-bit error check code is assigned to 4 bits of information bits (i.e., the format shown in FIG. 3) must be performed. In accordance with this error check code assignment information 951, the reformatting section 912 reformats the BSP 111 (which has been input in a binary form) to the format shown in FIG. 21A. On the other hand, while the main program 112 is being input, the code information management section 95 keeps outputting an error check code assignment information 951 which indicates that a reformatting to a form in which a 16-byte spare area is assigned to every 512 bytes of data must be performed. In accordance with this error check code assignment information 951, the reformatting section 912 reformats the main program 112 (which has been input in a binary form) to the format shown in FIG. 21B.

The write image generation section 92 merges the reformatting section outputs 913 from the image reformatting section 91 to generate a ROM image 924 to be written to the target memory, while paying attention to the position(s) of the bad block(s) included in the target memory. More specifically, the image merge section 921 merges the reformatting section outputs 913, which have been output in the form of separate files, into a single file. At this time, based on the bad block information 961 which is output from the bad block information retaining section 96, the image merge section 921 outputs data which is only valid for positions corresponding to normal blocks, thus avoiding the bad blocks.

Once the image merge section 921 has merged the reformatting section outputs 913 into a single file, it becomes certain which normal block the bad block information table 971 is to be stored in. Therefore, to the output from the image merge section 921, the bad block information table pointer assigning section 922 assigns the number of this normal block (corresponding to the bad block information table pointer 119).

Once the bad block information table pointer assigning section 922 has assigned the number of the aforementioned normal block, all data in the ROM image to be written to the target memory has been finalized, except for the error check code. Therefore, to the output from the bad block information table pointer assigning section 922, the error check code assigning section 923 assigns an error check code in accordance with the error check code assignment information 951 which is output from the code information management section 95. The error check code assigning section 923 assigns the first error check code 114 to the BSP 111, and assigns the second error check code 115 to the main program 112, for example.

The memory write section 932 writes to the target memory the ROM image 924 which is output from the write image generation section 92. At this time, based on the bad block information 961 retained in the bad block information retaining section 96, the memory write section 932 writes the ROM image 924 only to the normal blocks included in the target memory.

As described above, in accordance with the ROM image generation apparatus of the present embodiment, a ROM image including a BSP, a main program, and the like can be written to a memory which is used as the first storage device included in an information processing apparatus according to any one of the first to fifth embodiments.

An information processing apparatus according to the present invention is characterized so that it can stably perform system boot without employing a ROM or the like to store an initial program. Therefore, the information processing apparatus can be used for various information processing apparatuses, such as notebook type personal computers, mobile-type information devices, cellular phones, digital cameras, video movie devices, game machines, and the like.

While the invention has been described in detail, the foregoing description is in all aspects illustrative and not restrictive. It is understood that numerous other modifications and variations can be devised without departing from the scope of the invention.

What is claimed is:

1. An information processing apparatus for performing a system boot by using programs stored in a non-volatile storage device, comprising:
   a CPU;
   a non-volatile first storage device for storing, as programs to be executed by the CPU, a bootstrap program having a first check code assigned thereto, and a main program having a second check code assigned thereto, the second check code being calculated by a method different from that used for calculating the first check code;
   a volatile second storage device for storing the program read from the first storage device;
   a transferer for reading a program stored in the first storage device, wherein, during a system boot, the transferer reads the bootstrap program from the first storage device, subjects the bootstrap program to an error detection/correction process based on the first check code, and transfers the processed bootstrap program to the second storage device; and
   a CPU controller for prohibiting an operation of the CPU until the transfer of the bootstrap program is completed.

2. The information processing apparatus according to claim 1, wherein, when no longer prohibited by the CPU controller, in accordance with the bootstrap program stored in the second storage device, the CPU transfers the main program stored in the first storage device to the second storage device and subjects the main program to an error detection/correction process based on the second check code.

3. The information processing apparatus according to claim 1, wherein the transferer includes:
   a transfer control section for controlling the transfer of the bootstrap program;
   an error processing section for performing the error detection/correction process based on the first check code for the bootstrap program being transferred; and
   a notification section for, if the error processing section has not detected any uncorrectable errors when the transfer of the bootstrap program is completed, notifying completion of the transfer to the CPU controller.

4. The information processing apparatus according to claim 1, wherein the CPU controller prohibits supply of a clock signal for the CPU until the transfer of the bootstrap program is completed.

5. The information processing apparatus according to claim 1, wherein the CPU controller continuously supplies a reset signal for the CPU until the transfer of the bootstrap program is completed.

6. The information processing apparatus according to claim 1, wherein the CPU controller prevents the CPU from accessing the second storage device until the transfer of the bootstrap program is completed.

7. The information processing apparatus according to claim 6, wherein the CPU controller arbitrates an access right to a bus connected to the second storage device in such a manner that priority is given to the transferer until the transfer of the bootstrap program is completed and that priority is given to the CPU after the transfer of the bootstrap program is completed.

8. The information processing apparatus according to claim 1, wherein the CPU controller keeps prohibiting the CPU from operating if the transfer of the bootstrap program fails.

9. The information processing apparatus according to claim 1, wherein,
the first storage device includes a plurality of blocks each of which is identified as either a normal block or a bad block, and
the bootstrap program, the main program, and stored position information representing a stored position of the main program in the first storage device are stored in a normal block of the first storage device.

10. The information processing apparatus according to claim 9, wherein,
the bootstrap program includes the stored position information and an error processing program for performing the error detection/correction process based on the second check code, and
when no longer prohibited by the CPU controller, the CPU transfers the main program stored in the first storage device to the second storage device via the transferer in accordance with the stored position information after the error detection/correction process based on the first check code, and performs an error detection/correction process for the main program stored in the second storage device in accordance with the error processing program after the error detection/correction process based on the first check code.

11. The information processing apparatus according to claim 9, wherein
the first storage device stores the stored position information having the first check code assigned thereto,
the transferer performs an error detection/correction process based on the first check code also for the stored position information read from the first storage device,
the bootstrap program includes an address at which the stored position information is stored in the first storage device and an error processing program for performing the error detection/correction process based on the second check code, and
when no longer prohibited by the CPU controller, the CPU transfers the stored position information stored in the first storage device to the second storage device via the transferer by using the address after the error detection/correction process based on the first check code, transfers the main program stored in the first storage device to the second storage device via the transferer in accordance with the stored position information after the error detection/correction process based on the first check code, and performs an error detection/correction process for the main program stored in the second storage device in accordance with the error processing program after the error detection/correction process based on the first check code.

12. The information processing apparatus according to claim 9, wherein,
the bootstrap program is stored, in data units of a predetermined size, in the normal block of the first storage device, and
the transferer reads each data unit of the predetermined size of the bootstrap program from the first storage device, subjects the data unit to an error detection/correction process based on the first check code, and transfers the processed data unit to the second storage device.

13. The information processing apparatus according to claim 12, wherein, if an uncorrectable error is detected as a result of performing the error detection/correction process based on the first check code for the data unit of the predetermined size read from the first storage device, the transferer reads a next data unit to be processed from a normal block next to the block containing the data unit.

14. The information processing apparatus according to claim 12, wherein,
the bootstrap program is stored in the normal block of the first storage device in data units of the predetermined size and with a collation code assigned to each data unit, and
the transferer retains reference data for the collation code, and if a collation code which is identical to the reference data is assigned to the data unit of the predetermined size read from the first storage device, transfers the read data unit to the second storage device.

15. The information processing apparatus according to claim 14, wherein the transferer is arranged so as to allow the reference data to be changed based on given data.

16. The information processing apparatus according to claim 1, wherein, the transferer includes:
a transfer control section for controlling the transfer of the bootstrap program;
a first error processing section for performing the error detection/correction process based on the first check code for the bootstrap program being transferred;
a second error processing section for performing at least a portion of the error detection/correction process based on the second check code for the main program read from the first storage device; and
a notification section for, if the first error processing section has not detected any uncorrectable errors when the transfer of the bootstrap program is completed, notifying completion of the transfer to the CPU controller.

17. The information processing apparatus according to claim 16, wherein,
the second error processing section calculates a syndrome based on the second check code with respect to the main program read from the first storage device, and
in accordance with the bootstrap program stored in the second storage device, the CPU performs rest of the error detection/correction process based on the second check code for the main program read from the first storage device, by using the syndrome calculated by the second error processing section.

18. The information processing apparatus according to claim 16, wherein, when the notification section has notified completion of the transfer, the transferer switches the processing section to process the program read from the first storage device from the first error processing section to the second error processing section.

19. The information processing apparatus according to claim 16, wherein the transferer switches the processing section to process the program read from the first storage device from the first error processing section to the second error processing section under control of the CPU.

20. The information processing apparatus according to claim 16, wherein,
if the second error processing section has detected an uncorrectable error, the transferer notifies the CPU of a failure of the transfer, and
the CPU performs an abnormality handling process when receiving a notification of a failure of the transfer.

21. The information processing apparatus according to claim 1, wherein, in addition to transferring the bootstrap program, under control of the CPU, the transferer reads the main program from the first storage device in data units of a predetermined size, and transfers each data unit read to the second storage device.

22. An information processing apparatus for performing a system boot by using programs stored in a non-volatile storage device, comprising:

a CPU;

a non-volatile first storage device for storing, as programs to be executed by the CPU, a bootstrap program having a first check code assigned thereto, and a main program having a second check code assigned thereto, the second check code being calculated by a method different from that used for calculating the first check code;

a transferer for reading a program stored in the first storage device; and a volatile second storage device for storing the program read from the first storage device, wherein, the transferer reads the bootstrap program from the first storage device, subjects the bootstrap program to an error detection/correction process based on the first check code and internally stores the processed bootstrap program, and outputs the stored bootstrap program in response to a read request from the CPU, and during a system boot, the CPU operates in accordance with the bootstrap program stored in the transferer.

23. The information processing apparatus according to claim 22, wherein, the bootstrap program includes an error processing program for performing the error detection/correction process based on the second check code, and during the system boot, in accordance with the bootstrap program stored in the transferer, the CPU performs the error detection/correction process based on the second check code for the main program read from the first storage device.

* * * * *